(12) United States Patent
Nanjundaswamy et al.

(10) Patent No.: US 8,303,840 B2
(45) Date of Patent: Nov. 6, 2012

(54) ACID-TREATED MANGANESE DIOXIDE AND METHODS OF MAKING THEREOF

(75) Inventors: Kirakodu S. Nanjundaswamy, Sharon, MA (US); Fan Zhang, Needham, MA (US); Yichun Wang, West Roxbury, MA (US); James J. Cervera, Sandy Hook, CT (US); Jennifer A. Nelson, Waltham, MA (US); Gary A. Miller, Milton, MA (US); Rimma A. Sirotina, Ashland, MA (US)

(73) Assignee: The Gillette Company, Boston, MA (US)

( * ) Notice: Subject to any disclaimer, the term of this patent is extended or adjusted under 35 U.S.C. 154(b) by 371 days.

(21) Appl. No.: 12/722,751

(22) Filed: Mar. 12, 2010

(65) Prior Publication Data

US 2011/0220842 A1 Sep. 15, 2011

(51) Int. Cl.
*H01M 4/00* (2006.01)
*C01G 45/02* (2006.01)
*C25B 11/16* (2006.01)

(52) U.S. Cl. .................. 252/182.1; 423/605; 205/539; 429/424

(58) Field of Classification Search .............. 429/224; 423/605; 205/539
See application file for complete search history.

(56) References Cited

U.S. PATENT DOCUMENTS

| | | | |
|---|---|---|---|
| 1,275,666 A | 8/1918 | Wells | |
| 2,608,466 A | 8/1952 | Fox | |
| 2,956,860 A | 10/1960 | Welsh et al. | |
| 3,437,435 A | 4/1969 | Moore et al. | |
| 3,520,729 A | 7/1970 | Voss et al. | |
| 3,939,010 A * | 2/1976 | Coleman et al. | 429/118 |
| 4,136,236 A | 1/1979 | Rüetschi et al. | |
| 4,192,914 A | 3/1980 | Ruetschi | |
| 4,246,253 A | 1/1981 | Hunter | |
| 4,312,930 A | 1/1982 | Hunter | |
| 4,383,029 A | 5/1983 | Yamada et al. | |
| 4,451,543 A | 5/1984 | Dzieciuch et al. | |
| 4,777,100 A | 10/1988 | Chalilpoyil et al. | |
| 4,904,552 A * | 2/1990 | Furukawa et al. | 429/333 |
| 4,959,282 A | 9/1990 | Dahn et al. | |
| 5,277,890 A | 1/1994 | Wang et al. | |
| 5,348,726 A | 9/1994 | Wang et al. | |
| 5,391,365 A | 2/1995 | Wang et al. | |
| 5,425,932 A | 6/1995 | Tarascon | |
| 5,482,796 A | 1/1996 | Wang et al. | |
| 5,532,084 A | 7/1996 | Wang et al. | |
| 5,587,133 A | 12/1996 | Amatucci et al. | |
| 5,698,176 A * | 12/1997 | Capparella et al. | 423/605 |

(Continued)

FOREIGN PATENT DOCUMENTS
CA 1263697 12/1989
(Continued)

OTHER PUBLICATIONS

U.S. Appl. No. 12/722,669, filed Mar. 12, 2010, Nanjundas et al.

(Continued)

*Primary Examiner* — Robert S Loewe
(74) *Attorney, Agent, or Firm* — Fish & Richardson P.C.

(57) ABSTRACT

A primary battery includes a cathode having an acid-treated manganese dioxide, an anode, a separator between the cathode and the anode, and an alkaline electrolyte.

23 Claims, 9 Drawing Sheets

U.S. PATENT DOCUMENTS

| | | | |
|---|---|---|---|
| 5,720,932 | A | 2/1998 | Amine et al. |
| 5,753,202 | A * | 5/1998 | Wang et al. ............... 423/599 |
| 5,759,510 | A | 6/1998 | Pillai |
| 5,772,890 | A | 6/1998 | Hubred |
| 5,783,334 | A | 7/1998 | Yasuda |
| 5,798,180 | A | 8/1998 | Chowdhury et al. |
| 5,866,278 | A * | 2/1999 | Sumida et al. ............... 429/224 |
| 5,910,366 | A | 6/1999 | Chowdhury et al. |
| 5,952,124 | A | 9/1999 | Kainthla |
| 5,955,052 | A | 9/1999 | Padhi et al. |
| 6,074,784 | A | 6/2000 | Maruta |
| 6,159,636 | A * | 12/2000 | Wang et al. ............... 429/223 |
| 6,162,561 | A | 12/2000 | Wang et al. |
| 6,270,921 | B1 | 8/2001 | Kaplan et al. |
| 6,284,410 | B1 | 9/2001 | Durkot et al. |
| 6,334,993 | B1 | 1/2002 | Suita et al. |
| 6,335,119 | B1 | 1/2002 | Maruta |
| 6,428,766 | B1 | 8/2002 | Fujino et al. |
| 6,440,181 | B1 * | 8/2002 | Bowden et al. ............... 29/623.1 |
| 6,472,103 | B1 | 10/2002 | Durkot et al. |
| 6,492,062 | B1 | 12/2002 | Wang et al. |
| 6,509,117 | B1 | 1/2003 | Bowden et al. |
| 6,521,378 | B2 | 2/2003 | Durkot et al. |
| 6,566,009 | B1 | 5/2003 | Noya et al. |
| 6,589,693 | B1 | 7/2003 | Kilby et al. |
| 6,620,550 | B2 | 9/2003 | Christian et al. |
| 6,667,131 | B1 | 12/2003 | Vitins et al. |
| 6,753,109 | B2 | 6/2004 | Nanjundaswamy et al. |
| 6,759,166 | B2 | 7/2004 | Wang et al. |
| 6,783,893 | B2 | 8/2004 | Bowden et al. |
| 6,794,082 | B2 | 9/2004 | Mori et al. |
| 6,818,347 | B1 | 11/2004 | Jin et al. |
| 6,858,349 | B1 | 2/2005 | Luo et al. |
| 6,932,846 | B2 | 8/2005 | Bowden et al. |
| 6,991,875 | B2 | 1/2006 | Christian et al. |
| 7,045,247 | B1 | 5/2006 | Copeland et al. |
| 7,045,252 | B2 | 5/2006 | Christian et al. |
| 7,081,319 | B2 | 7/2006 | Christian et al. |
| 7,247,407 | B2 | 7/2007 | Durkot et al. |
| 7,273,680 | B2 | 9/2007 | Durkot et al. |
| 7,407,521 | B2 | 8/2008 | Shimakawa et al. |
| 7,407,726 | B2 | 8/2008 | Wang et al. |
| 7,435,395 | B2 | 10/2008 | Durkot et al. |
| 7,569,306 | B2 | 8/2009 | Kato et al. |
| 2002/0172867 | A1 | 11/2002 | Anglin |
| 2004/0009400 | A1 | 1/2004 | Yamaguchi et al. |
| 2005/0079424 | A1 | 4/2005 | Davis et al. |
| 2005/0164085 | A1 * | 7/2005 | Bofinger et al. ............... 429/224 |
| 2005/0221181 | A1 | 10/2005 | Durkot et al. |
| 2007/0015054 | A1 | 1/2007 | Nunome et al. |
| 2007/0248879 | A1 | 10/2007 | Durkot et al. |
| 2008/0008937 | A1 | 1/2008 | Eylem et al. |
| 2008/0032198 | A1 * | 2/2008 | Yamaguchi et al. ......... 429/224 |
| 2008/0171266 | A1 | 7/2008 | Kato et al. |
| 2008/0193487 | A1 | 8/2008 | Schild et al. |
| 2008/0193847 | A1 | 8/2008 | Suetsugu et al. |
| 2008/0241683 | A1 | 10/2008 | Fensore et al. |
| 2009/0047578 | A1 | 2/2009 | Iwamoto et al. |
| 2009/0249614 | A1 | 10/2009 | Davis et al. |
| 2009/0258297 | A1 | 10/2009 | Davis et al. |
| 2010/0003596 | A1 | 1/2010 | Sato et al. |

FOREIGN PATENT DOCUMENTS

| | | |
|---|---|---|
| JP | 62 087418 | 4/1987 |
| JP | 2007-026896 | 2/2007 |
| WO | WO 2004/018794 | 2/2004 |
| WO | WO 2006/121622 | 11/2006 |
| WO | WO 2009/082862 | 7/2009 |

OTHER PUBLICATIONS

U.S. Appl. No. 12/722,726, filed Mar. 12, 2010, Nelson et al.
U.S. Appl. No. 12/722,800, filed Mar. 12, 2010, Nanjundas et al.
Abbas et al., "Hydroxyl as a defect of the manganese dioxide lattice and its applications to the dry cell battery", Journal of Power Sources, vol. 58:15-21 (1996).
Alcantara et al., "Chemically deintercalated cathode materials for lithium cells", Ionics, vol. 1(3):246-250 (1995)(Abstract only).
Alcantara et al., "Structure and electrochemical properties of $Li_{1-x}(Ni_yCo_{1-y})_{1-x}O_2$", J. Electrochem. Soc. vol. 142(12):3997-4005 (1995).
Ammundsen et al., "Effect of Chemical Extraction of Lithium on the Local Structure of Spinel Lithium Manganese Oxides Determined by X-ray Absorption Spectroscopy", Chemistry of Materials, vol. 7:2151-60 (1995).
Ammundsen, D.J., "Mechanism of Proton Insertion and Characterization of the Proton Sites in Lithium Manganate Spinels", Jones & J. Roziere, Chem. Mater., vol. 8:2799-2808 (1996).
Arai et al., "Characteristics of $Li_xNiO_2$ obtained by chemical delithiation", Journal of Power Sources, vols. 81-82:401-405 (1999).
Arai et al., "Nickel dioxide polymorphs as lithium insertion electrodes", Electrochimica Acta vol. 47:2697-2705 (2002).
Arai et al., "Structural and thermal characteristics of nickel dioxide derived from $LiNiO_2$", Journal of Solid State Chemistry, vol. 163:340-349 (2002).
Arai et al., "Synthesis and electrode performance of layered nickel dioxide containing alkaline ions", Electrochimica Acta vol. 50:1821-1828 (2005).
Ariza et al., "Probing the local structure and the role of protons in lithium sorption processes of a new lithium-rich manganese oxide", Chem. Mater. vol. 18:1885-1890 (2006).
Armstrong, Demonstrating oxygen loss and associated structural reorganization in the lithium battery cathode $Li[Ni_{0.2}Li_{0.2}Mn_{0.6}]O_2$, JACS vol. 128:8694-98 (2006).
Arunkumar et al., "Chemical an destructural instability of the chemically delithiated $(1-z)Li[Li_{1/3}Mn_{2/3}]O_2$ $(z)Li[Co_{1-y}Ni_y]O_2 \leq \gamma \geq 1$ and 0 and $\leq 1$) solid solution cathodes", J. Mater. Chem. vol. 18:190-198 (2008).
Axmann et al., "Formation of $Fe^{IV}$ and $Ni^{IV}$ by electrochemical and chemical oxidation of an iron-substituted nickel(II) hydroxide: the direct two-electronic step $Ni^{II} \rightarrow Ni^{IV} + 2e$", Angen Chem. Int. Ed. Eng. vol. 35(10):1115 (1996).
Axmann et al., "Nickel hydroxide as a matrix for unusual valencies: the electrochemical behaviour of metal(III)-ion-substituted nickel hydroxides of the pyroaurite type", J. Alloys and Cpds. vol. 246(1-2):232-241 (1997)(abstract only).
Benhaddad et al., "Reactivity of Nanostructured $MnO_2$ in Alkaline Medium Studied with a Micro-Cavity Electrode: Effect of Synthesizing Temperature", Applied Materials and Interfaces, vol. 1(2):424-432 (2009).
Blesa et al., "A new route to $\gamma$-$Fe_2O_3$ via an intermediate oxyhydroxide. The reaction of $\alpha$-$NaFeO_2$ with benzoic acid", J. Mater. Chem. vol. 9:227-231 (1999).
Blesa et al., "Nonstoichiometric spinel ferrites obtained from alpha-NaFeO2 via molten media reactions", Inorganic Chem. vol. 41(23):5961-5967 (2002)(Abstract only).
Blesa et al., "$\alpha$-$NaFeO_2$: ionic conductivity and sodium extraction", Solid State Ionics, vol. 126:81-87 (1999).
Bolibar et al., "Synthesis, characterization and thermal decomposition study of some nickel nitro derivatives", J. Mater, Chem. vol. 7(11):2259-64 (1997).
Cheng et al., "Facile controlled synthesis of $MnO_2$ nanostructures of novel shapes and their application in batteries", Inorganic Chemistry, vol. 45(5):2038-2044 (2005).
Chitrakar et al., "A new type of manganese oxide ($MnO_2$$0.5H_2O$) derived from $Li_{1.6}Mn_{1.6}O_4$ and its lithium ion-sieve properties", Chem.. Mater. vol. 12:3151-3157 (2000).
Choi et al., "Proton insertion into oxide cathodes during chemical delithiation", Electrochemical and Solid State Letters, vol. 9(5):A241-244 (2006).
Crompton, *Battery Reference Book*, "Guidelines to battery selection", 3rd ed., Oxford: Reed Educational and Professional Publishing, Ltd. Chapter 2 (2000).
Dahn et al., "Structure and electrochemistry of $Li_{1+y}NiO_2$ and a new $Li_2NiO_2$ phase with the $Ni(OH)_2$ structure", Solid State Ionics, vol. 44(1-2):87-97 (1990).
Dai et al., "Preparation and Characterization of Nanostructured $MnO_2$ for Lithium Batteries", Proc. 40th Power Sources Conf., pp. 283-286 (2002).

David et al., "Structure Refinement of the Spinel-Related Phases $Li_2Mn_2O_4$ and $Li_{0.2}Mn_2O_4$", Journal of Solid State Chemistry, vol. 67(2):316-323 (1987).

Delmas, "On the behavior of the $Li_xNiO_2$ system: an electrochemical and structural overview", J. Power Sources vol. 68:120-25 (1997).

Dominko et al., "A novel coating technology for preparation of cathodes in li-ion batteries", Electrochemical and Solid State Letters, vol. 4(11):A187-A190 (2001).

Dutta et al., "Chemical synthesis and properties of $Li_{1-8-x}$, $Ni1+8 O_2$ and $Li[Ni_2]O_4$", J. Solid State Chemistry, vol. 96:123-131 (1992).

Endres et al., "Extraction of lithium from spinel phases of the system $Li_{1-x}Mn_{2-x}O_{4-8}$", J. Power Sources, vol. 69:145-156 (1997).

Fang et al. "Low-temperature synthesis of highly crystallized $LiMn_2O_4$ from alpha manganese dioxide nanorods", Journal of Power Sources, vol. 184:494-7 (2008).

Feng et al., "Alkali metal ions insertion/extraction reactions with hollandite-type manganese oxide in the aqueous phase", Chem. Mater. vol. 7:148-153 (1995).

Feng et al., "Synthesis of hollandite-type manganese dioxide with $H^+$ form for lithium rechargeable battery", J. Electrochem. Soc., vol. 141(10):L135 (1994).

Feng et al. "$Li^+$ Extraction/Insertion with Spinel-Type Lithium Manganese Oxides. Characterization of Redox-Type and Ion-Exchange-Type Sites", Langmuir vol. 8:1861-1867 (1992).

Fong et al. "A powder neutron diffraction study of λ and γ manganese dioxide and of $LiMn_2O_4$", Zeitschrift fur Kristallographie, vol. 209:941-945 (1994).

Franger et al., "Development of new low temperature manganese oxides as lithium insertion compounds", Recent Research Developments in Solid State Ionics, vol. 3:1-22 (2006)(abstract only).

Gao, "Synthesis and Characterization of $Li_{1+x}Mn_{2-x}O_4$ for Li-Ion Battery Applications", Journal of the Electrochemical Society, vol. 143(1):100-114 (1996).

Gummow et al. "Improved capacity retention in rechargeable 4 V lithium/lithium-manganese oxide (spinel) cells", Solid State Ionics, vol. 69:59-67 (1994).

Hill et al. "Electrochemical Synthesis of Beta- and Gamma-Manganese Dioxides under Hydrothermal Conditions", Electrochemical and Solid State Letters, vol. 4(6):D1-3 (2001).

Hunter et al., "Nonaqueous electrochemistry of LAMBDA-$MnO_2$", Proc. Electrochem. Soc., vol. 85(4):444-51 (1985).

Hunter et al. "Preparation of a New Crystal Form of Manganese Dioxide: λ-$MnO_2$", Journal of Solid State Chemistry, vol. 39:142-147 (1981).

Ji et al., "Simple fabrication of nano-sized $NiO_2$ powder and its application to oxidation reactions", Applied Catalysis A: general, vol. 282(1-2):25-30 (2005)(Abstract only).

Kanoh et al., In situ raman spectroscopic study on electroinsertion of $Li^+$ into a Pt/λ-$MnO_2$ electrode in aqueous solution, Electrochem and Solid State Letters, vol. 1(1):17-19 (1998).

Kanoh et al., "Selective electroinsertion of lithium ions into a Pt/λ-$MnO_2$ electrode in the aqueous phase", Langmuir vol. 7:1841-2 (1991).

Kanzaki et al., "Mechanism of Lithium Ion Insertion into λ-$MnO_2$", J. Electrochem. Soc., vol. 138(1):333-4 (1991).

Kao et al., "Phase transformation of gamma-EMD to beta manganese dioxide during digestion in sulfuric acid", J. Electrochem Soc. vol. 134:1321-1252 (2008).

Kijima et al., "Preparation and Characterization of Open Tunnel Oxide λ-$MnO_2$ Precipitated by Ozone Oxidation", Journal of Solid State Chemistry, vol. 159:94-102 (2001).

Kim et al. "Direct carbon-black coating on $LiCoO_2$ cathode using surfactant for high-density Li-ion cell", Journal of Power Sources vol. 139:289-294 (2005).

Komaba et al. "Preparation and electrochemical performance of composite oxide of alpha manganese dioxide and Li-Mn-O spinel", Electrochimica Acta vol. 50:2297-2305 (2005).

Komaba et al. "Synthesis of layered $MnO2$ by calcination of $KMnO_4$ for rechargeable lithium battery cathode", Electrochimica Acta, vol. 46:31-35 (2000).

Kozawa, "Formation of Manganate and Permanganate Ions from Manganese Dioxide in Aqueous Solution", J. Electrochem. Soc. Japan (Denki Kagaku), vol. 44(8):508-13 (1976).

Lander et al., "Barium-nickel oxides with tri- and tetravalent nickel", Contribution from the Bell Telephone Laboratories, vol. 73:2452-2454 (1951).

Larcher et al. "Synthesis of $MnO_2$ Phases from $LiMn_2O_4$ in Aqueous Acidic Media", Journal of the Electrochemical Society, vol. 145(10):3393-3400 (1998).

Lavela et al., "Chemical delithiation, thermal transformations and electrochemical behaviour of iron-substituted lithium nickelate", Materials Research Society Symposium Proceedings pp. 658 (2001)(Abstract only).

Lavela et al., "Effects of partial acid delithiation on the electrochemical lithium insertion properties of nickel-stabilized $LiMn_2O_4$ spinel oxides", J. of Solid State Chemistry, vol. 150:196-203 (2000).

Lee et al., "Identification of a new strontium Ni(III) oxide prepared in molten hydroxides", J. Solid State Chem. vol. 93:267-71 (1991).

Linden and T. B. Rebby, *Handbook of Batteries*, New York: McGraw-Hill Co., Inc. (1995) "1.4 Classification of Cells and Batteries," pp. 1.9-1.11; "7.1 General Characteristics and Applications of Primary Batteries," pp. 7.3-7.7; "11/13 Lithium/Bismuth Oxide Cells," pp. 11-79 to 11-81; Chapter 12, "Silver Oxide Cells," pp. 12.1-12-16; "23.1 General Characteristics and Applications of Secondary Batteries," pp. 23.3-23.12.

Liu et al., "Preparation and alkali-metal ion extraction/insertion reactions with nanofibrous manganese oxide having 2 × 4 tunnel structure", chem.. Mater, vol. 15:3696-3703 (2003).

Lu et al. "Characterization of structure and electrochemical properties of lithium manganese oxides for lithium secondary batteries hydrothermally synthesized from δ-$K_xMnO_2$", Electrochimica Acta, vol. 49:2361-2367 (2004).

Lubin et al., "Chemical lithium extraction from manganese oxides for lithium rechargeable batteries", J. Power Sources vol. 34:161-173 (1991).

Maruta et al., "Low-temperature synthesis of lithium nickelate positive active material from nickel hydroxide for lithium cells", Journal of Power Sources, vol. 90:89-94 (2000).

Morales et al., "Acid-delithiated $Li_{1-x}(Ni_yCo_{1-y})_{1+x}O_2$ as insertion electrodes in lithium batteries", J. Solid State Chemistry, vol. 113(1):182-92 (1994)(abstract only).

Morales et al., "Cation distribution and chemical deintercalation of $Li_{1-x}Ni_{1+x}O_2$", Materials Research Bulletin, vol. 25(5):623-630 (1990).

Morales et al., Thermal behavior of chemically deintercalated lithium mickel oxide ($Li_{1-x}Ni_{1+x}O_2$), J. Thermal Analysis, vol. 38(3):295-301 (1992)(abstract only).

Mosbah et al., "Phases $Li_xMnO_2$λ rattachees au type spinelle", Materials Research bulletin, vol. 18:1375-1381 (1983).

Motohashi et al., "Synthesis and properties of $CoO_2$, the x = 0 End member of the $Li_xCoO2$ and $Na_xCoO_x$ systems", Chem. Mater. vol. 19:5063-5066 (2007).

Nishimura et al., Shizen Sozai Gakkai-shi, vol. 107(11):805-10 (1991).

Ohzuku et al. "Electrochemistry of Manganese Dioxide in Lithium Nonaqueous Cell", Journal of the Electrochemical Society, vol. 137(3):769-775 (1990).

Ooi et al., "Lithium-ion insertion/extraction reaction with λ-$MnO_2$ in the aqueous phase", Chemistry Letters, pp. 989-992 (1998).

Ooi et al., "Mechanism of $Li^+$ insertion in spinel-type manganese oxide. Redox and ion-exchange reactions", Langmuir vol. 7:1167-71 (1991).

Palacin et al., "Low-temperature synthesis of $LiNiO_2$", J. Electrochem. Soc. vol. 144(12):4226-4236(1997).

Patrice et al. "Understanding the second electron discharge plateau in $MnO_2$-based alkaline cells", ITE Letters on Batteries, vol. 2(4):B6-14 (2001).

Puckhaber et al., "Laser Diffraction—Millennium-Link for Particle Size Analysis", Powder Handling & Processing, vol. 11(1):91-5(1999).

Read et al. "Low Temperature Performance of λ-$MnO_2$ in Lithium Primary Batteries", Electrochemical and Solid State Letters, vol. 4(1):A162-5 (2001).

Rossouw et al., "Alpha manganese dioxide for lithium batteries: A structural and electrochemical study", Mat. Res. Bull. vol. 27:221-230 (1992).

Schilling et al. "Thermodynamic Stability of Chemically .Delithiated Li(Li$_x$Mn$_{2-x}$)O$_4$", Journal of the Electrochemical Society, vol. 145(2):569-575 (1998).

Schilling et al., "Modification of the high rate discharge behavior of Zn-MnO$_2$ alkaline cells through the addition of metal oxides to the cathode", ITE Letters on Batteries, vol. 2(3):B24-31 (2001).

Shen et al. "Phase Transitions and Ion Exchange Behavior of Electrolytically Prepared Manganese Dioxide", J. Solid State Chem., vol. 64:270-282 (1986).

Stoyanova et al., "Effect of Mn-substitution for Co on the crystal structure and acid delithiation of LiMn$_y$Co$_{1-y}$O$_2$ solid soluations", Solid States Ionics, vol. 73(3-4):233-240 (1994).

Stoyanova et al., "New data on chemical delithiation of Li$_x$Ni$_{2-x}$O$_2$ (0.6 < x < 1)", J. Solid State chemistry, vol. 108:211-218 (1994).

Sun et al. "Low temperature synthesis of layered LiNiO$_2$ cathode material in air atmosphere by ion exchange reaction", Solid State Ionics, vol. 177:1173-7 (2006).

Takeda et al., Crystal chemistry and physical properties of La$_{2-x}$Sr$_x$NiO$_4$(O $\leqq$ x $\geqq$ 1.6), Mat. Res. Bull. vol. 25:293-306 (1990).

Tang et al., "Lithium ion extraction from orthorhornibic LiMnO$_2$ in ammonium peroxodisulfate solutions", Journal of Solid State Chemistry, vol. 142:19-28 (1999).

Tang et al., "Preparation of plate-form manganese oxide by selective lithium extraction from monoclinic Li$_2$Mn$_{O3}$ under hydrothermal conditions", Chem. Mater. vol. 12:3271-3279 (2000).

Thackarey, "Manganese oxides for lithium batteries", Progress in Solid State Chemistry, vol. 25:1-75 (1997).

Venkatraman et al., "Factors influencing the chemical lithium extraction rate from layered LiNi$_{1-y-z}$Co$_y$Mn$_z$O$_2$ cathodes", Electrochemistry Communications, vol. 6:832-37 (2004).

Walanda et al. "Hydrothermal MnO$_2$: synthesis, structure, morphology and discharge performance", Journal of Power Sources vol. 139:325-341 (2005).

Wang et al. "Selected-Control Hydrothermal Synthesis of α- and β-MnO$_2$ Single Crystal Nanowires", Journal of the American Chemical Society, vol. 124(12):2280-1 (2002).

Wang et al. "A novel chemically synthesized manganese dioxide—its preparation and structural characterization", Progress in Batteries and Battery Materials, vol. 17:222-231 (1998).

Xia et al. "Study on the electrochemical performance of λ-MnO$_2$ in alkaline solution", Dianyuan Jishu, vol. 23(Suppl.):74-76 (1999)(abstract only).

Yang et al., "Synthesis of Li$_{1.33}$Mn$_{1.67}$O$_4$ spinels with different morphologies and their ion adsorptivities after delithiation", J. Mater. Chem. vol. 10:1903-1909 (2000).

Yin et al., X-ray/neutron diffraction and electrochemical studies of chemical lithium De/Re-Intercalation in Li$_{1-x}$Co$_{1/3}$Ni 1/3 Mn$_{1/3}$O$_2$ (x = → 1), Chem. Mater. vol. 18:1901-1910 (2006).

Zhecheva et al., New phases obtained by acid delithiation of layered LiMO$_2$ (M=Co, Ni), Material Science Forum vols. 152-153:259-262 (1994).

Zhecheva, et al., "Li$_{1-x-y}$H$_y$CoO$_2$", J. Solid State Chemistry, vol. 109(1):47-52 (1994)(Abstract only).

* cited by examiner

ACID-TREATED MANGANESE DIOXIDE AND METHODS OF MAKING THEREOF

FIELD OF THE INVENTION

The invention relates to cathode active materials and methods of making the cathode active materials.

BACKGROUND

Batteries, such as alkaline batteries, are commonly used as electrical energy sources. Generally, a battery contains a negative electrode (anode) and a positive electrode (cathode). The negative electrode contains an electroactive material (such as zinc particles) that can be oxidized; and the positive electrode contains an electroactive material (such as manganese dioxide) that can be reduced. The active material of the negative electrode is capable of reducing the active material of the positive electrode. In order to prevent direct reaction of the active material of the negative electrode and the active material of the positive electrode, the electrodes are mechanically and electrically isolated from each other by an ion-permeable separator.

When a battery is used as an electrical energy source for a device, such as a cellular telephone, electrical contact is made to the electrodes, allowing electrons to flow through the device and permitting the oxidation and reduction reactions to occur at the respective electrodes to provide electrical power. An electrolyte solution in contact with the electrodes contains ions that diffuse through the separator between the electrodes to maintain electrical charge balance throughout the battery during discharge.

SUMMARY

The invention relates to batteries, and to related components and methods. The batteries include an acid-treated cathode active material. The acid-treated manganese dioxide has been treated with acid at a relatively low temperature, which can reduce the amount of Mn(III), increase the amount of Mn(IV), and/or remove acid-soluble impurities. A battery that includes a cathode including acid-treated manganese dioxide can have improved capacity, increased discharged voltage, increased potential lattice vacancies and lattice moisture content.

In one aspect, the invention features a method of making a cathode, including treating an untreated manganese dioxide with an aqueous acid at a temperature of fifteen degrees Celsius or less to afford an acid-treated manganese dioxide; and incorporating the acid-treated manganese dioxide into a cathode.

In another aspect, the invention features a method of making a battery, including incorporating a cathode including an acid-treated manganese dioxide that has been prepared by treating an untreated manganese dioxide with an aqueous nitric acid at a temperature of 60 degrees Celsius or more and 100 degrees Celsius or less, into a battery.

In a further aspect, the invention features a method of making a battery, including incorporating a cathode including an acid-treated manganese dioxide that has been prepared by treating an untreated manganese dioxide with an aqueous acid at a temperature of 15 degrees Celsius or less, into a battery.

In yet a further aspect, the invention features a battery including a cathode active material including an acid-treated manganese dioxide a Mn(III) content of less than three percent, by weight of total manganese dioxide. The battery has an initial open circuit voltage of greater than 1.69V.

Embodiments can include one or more of the following features.

The untreated manganese dioxide can include an electrolytic manganese dioxide, a chemically synthesized manganese dioxide, and/or combinations thereof. The untreated manganese dioxide can be treated with an aqueous acid at a temperature of zero degree Celsius or more to five degrees Celsius or less to afford the acid-treated manganese dioxide. The untreated manganese dioxide can have a formula of $MnO_x$, wherein x is 1.90 or more. The acid-treated manganese dioxide can include a decreased amount of Mn(III) and an increased amount of Mn(IV) compared to the untreated manganese dioxide. For example, the acid-treated manganese dioxide can include a Mn(III) content of three percent by weight or lower, by weight of total manganese dioxide. The acid-treated manganese dioxide can include a lower impurity content (e.g., 1% or more lower, 2% or more lower, or 3% or more lower and/or 5% or less, 3% or less, 2% or less, 1% or less impurity) than the untreated manganese dioxide. For example, the impurity can include Fe, Na, Ca, Al, Co, Mo, Cr, Cu, Pb, V, Ni, Sb, As, Ge, and combinations thereof. The acid-treated manganese dioxide can include a Fe content of less than 20 ppm, a Na content of less than 500 ppm, a Ca content of less than 100 ppm, and/or a Al, Co, Mo, Cr, Cu, Pb, V, or Ni content of each less than one ppm.

The acid-treated manganese dioxide has an increased specific capacity of at least +3% or more relative to the untreated manganese dioxide. The specific capacity can depend on the discharge cut-off voltage (e.g., 0.8 to 1.0V range) and the type of acid used (e.g., nitric or sulfuric acid) as seen in a button cell. For example, the acid-treated manganese dioxide can have a specific capacity increase of between 3 and 10% relative to the untreated the manganese dioxide. The acid-treated manganese dioxide has a BET surface area increase of between 5 and 20% relative to the untreated manganese dioxide. In some embodiments, the increase in BET surface area can depend on the BET surface area of a precursor untreated manganese dioxide.

The method can further include milling the untreated manganese dioxide prior to treating with an aqueous acid. After milling, the untreated manganese dioxide can have an average particle diameter that is smaller than an average particle diameter of the untreated manganese dioxide (e.g., about 40 micrometers) prior to milling. For example, after milling, the untreated manganese dioxide can have an average particle diameter of about five micrometers or less.

The untreated manganese dioxide can be treated with the aqueous acid for 12 to 24 hours. The aqueous acid can include aqueous sulfuric acid. In some embodiments, the method includes reusing the aqueous sulfuric acid for treating the untreated manganese dioxide. The aqueous acid can have a concentration of between 2 M and 12 M (e.g., between 2 and 10 M, between 2 and 7 M). The acid treatment can occur at a temperature of 85 degrees or more and 100 Celsius or less.

When incorporated into a battery, the acid-treated manganese dioxide can provide a AA battery with a performance increase of up to 30% (e.g., between 1 and 30%, between 10 and 30%, or between 20 and 30%) relative to a AA battery including an untreated manganese dioxide, when measured in a digital camera test. The battery can have a lower in cell gas volume than a battery including an untreated manganese dioxide. The battery can have a discharge voltage increase of between 0.5 and 3% over a range of 0.8 V to 1.75 V relative to a battery including an untreated manganese dioxide.

Embodiments can include one or more of the following advantages.

In some embodiments, acid treatment can decrease the amount of Mn(III), increase the Mn(IV) content, and/or decrease the amount of impurities in a manganese dioxide, thereby increasing performance of a battery including the resulting acid-treated manganese dioxide. The acid treatment can fully or partially recover a loss in capacity due to milling of a manganese dioxide and/or mechanical/chemical reduction of manganese in the manganese dioxide. In some embodiments, a milled manganese dioxide improves packing of a cathode active material and can increase the capacity of a battery including a milled acid-treated manganese dioxide and a companion manganese dioxide that has not been milled.

The acid-treatment can be relatively easily integrated into a cathode active material's manufacturing process. For example, a volume of acid (e.g., sulfuric acid) can be used multiple times (e.g., once, twice, three times, four times, five times, six times, seven times, or more) in a manufacturing process of manganese dioxide. In some embodiments, acid-treatment of manganese oxide can reduce impurities in manganese dioxide and can lead to decreasing costs in battery production, as less pure manganese dioxide can be treated relatively cheaply to provide a high purity manganese oxide. In addition, the acid-treatment can be amenable to large scale manufacturing conditions.

Other aspects, features, and advantages of the invention will be apparent from the drawing, description, and claims.

DETAILED DESCRIPTION

Figure 1:
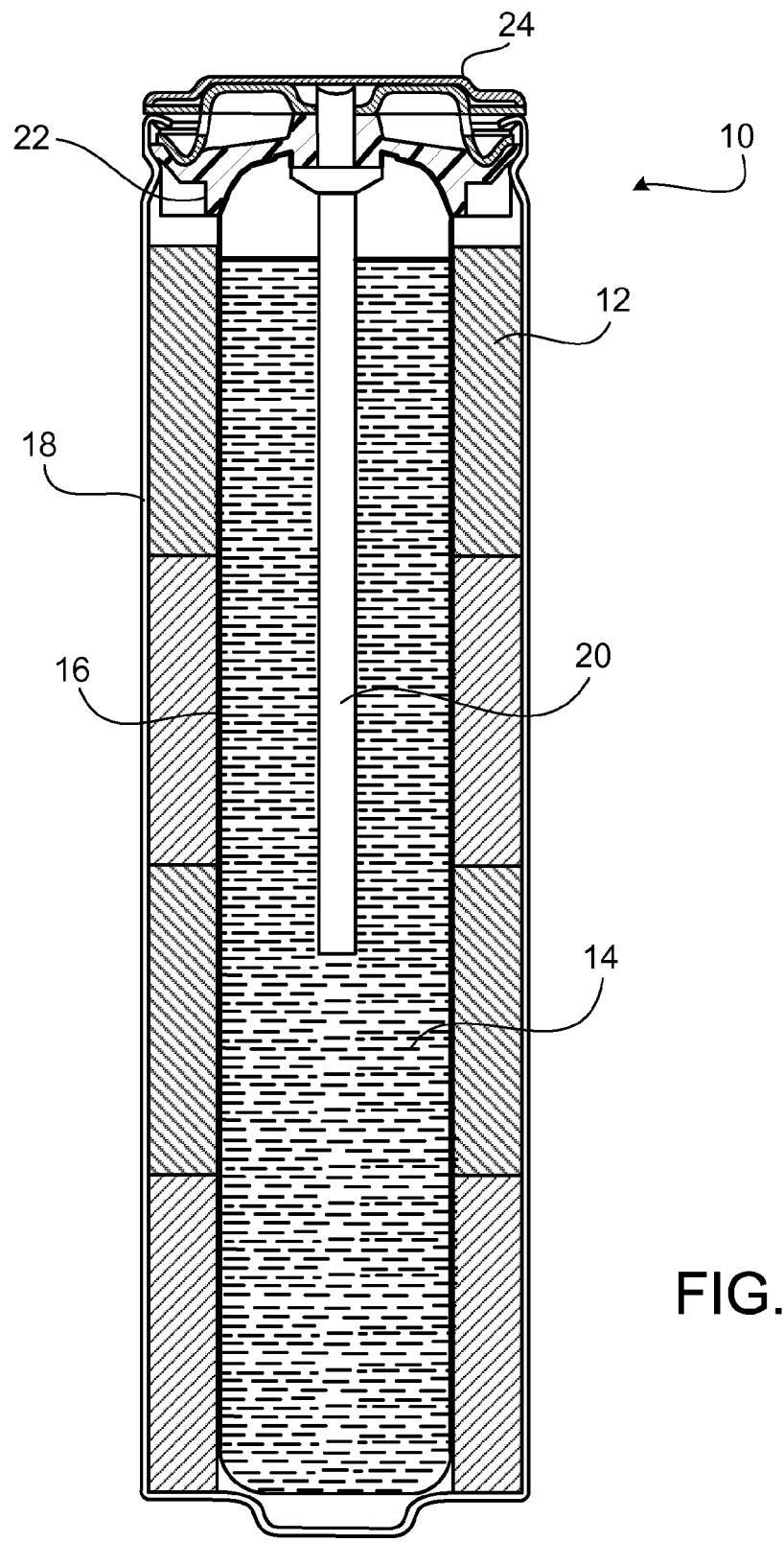
FIG. 1 is a schematic side-sectional view of a battery.

Referring to FIG. 1, a battery 10 includes a cylindrical housing 18, a cathode 12 in the housing, an anode 14 in the housing, and a separator 16 between the cathode and the anode. Battery 10 also includes a current collector 20, a seal 22, and a metal top cap 24, which serves as the negative terminal for the battery. Cathode 12 is in contact with housing 18, and the positive terminal of battery 10 is at the opposite end of battery 10 from the negative terminal. An electrolyte solution, e.g., an alkaline solution, is dispersed throughout battery 10.

Cathode 12 includes an electrochemically active material including an acid-treated manganese dioxide. The cathode can further include an electrically conductive additive and optionally a binder. The acid-treated manganese dioxide has been treated with acid at a relatively low temperature, which can reduce the amount of Mn(III), increase the amount of Mn(IV), and/or remove acid-soluble impurities. A battery that includes a cathode including acid-treated manganese dioxide can have improved capacity, increased discharged voltage, increased potential vacancies and lattice moisture content.

Prior to acid treatment, an untreated manganese dioxide can include electrolytic manganese dioxide (EMD) and/or chemically produced manganese dioxide (CMD). EMD can include manganese dioxide that is deposited anodically from a Mn(II) solution, such as $MnSO_4$ in sulfuric acid, at relatively high temperatures (>90° C.) and specific current densities ranging from 2-12 $mA/cm^3$. The resulting EMD can have different proportions of gamma (e.g., produced at relatively low acid concentrations) and alpha phase (e.g., produced at higher acid concentrations) manganese dioxides. In contrast, CMD can be produced by oxidation of low valent Mn salts or reduction of high valent Mn salts by chemical agents. The resulting CMD can have gamma, delta, and alpha forms, depending on synthesis conditions.

In some embodiments, to increase performance of a battery, the amount of Mn(IV) within the manganese dioxide can be increased, the ramsdellite content can be increased, and/or the vacancy content of the $MnO_2$ can be increased. Without wishing to be bound by theory, it is believed that conventional commercial manganese dioxide materials include an amount of Mn(III), which can decrease the discharge capacity from a theoretical discharge capacity. To compensate for the presence of Mn(III), in a crystal lattice of the manganese dioxide materials, protons are replaced by up to 3000 ppm of sodium ions during post-treatment processing of the manganese dioxide in a manufacturing process. However, after the manganese dioxide is fully manufactured ("untreated manganese dioxide"), by further treating the manganese dioxide with an aqueous sulfuric acid solution at low temperature (e.g., below a room temperature of 21° C.), it is possible to decrease the amount of Mn(III), increase the Mn(IV) content in manganese dioxide, decrease the amount of impurities, and/or increase the vacancy content, and thereby increase performance of a battery including the resulting manganese dioxide ("acid-treated manganese dioxide"). In addition, the low temperature acid treatment can influence the characteristic of an intergrowth structure in the manganese dioxide, decrease the likelihood of generation of $\beta$-$MnO_2$ or pyrolusite fractions, which are associated with higher temperature acid treatments.

Generally, acid-treatment includes adding an untreated manganese dioxide to a solution of aqueous sulfuric acid to form a slurry, with constant stirring at a temperature of 20° C. or less (e.g., between 0 and 5° C.) for a period of time. In some embodiments, the acid solution is pre-cooled before addition of untreated manganese dioxide. In some embodiments, the acid treatment can occur under inert atmosphere. After acid exposure, the manganese dioxide is washed and dried to provide an acid-treated manganese dioxide.

In some embodiments, when untreated manganese dioxide is added to an aqueous sulfuric acid solution to form slurry, it is believed that Mn(III) fractions within the manganese dioxide can dissolve into the aqueous acid. In some embodiments, dissolution of Mn(III) fraction of manganese dioxide can be influenced by the temperature, the selected acid, and the concentration of the aqueous acid solution. Once dissolved, the Mn(III) can undergo disproportionation into Mn(II) and Mn(IV) ions, and the Mn(IV) can reprecipitate onto the manganese dioxide (e.g., onto a γ-$MnO_2$ fraction in the $MnO_2$) while Mn(II) stays in solution, thereby increasing the total Mn(IV) content in manganese dioxide. The reprecipitation of Mn(IV) ions can be influenced by temperature, oxygen partial pressure, and acid concentration. Without wishing to be bound by theory, it is believed that Mn(II) in solution can be oxidized to Mn(III) and Mn(IV) by air, and that lower temperatures (e.g., a temperature below room temperature of 21° C.) can reduce the likelihood of Mn(II) oxidation by air. Lower temperature can also reduce the likelihood of precipitation of $Mn_2O_3$ or electrochemically inactive forms of $MnO_2$.

The sulfuric acid can be in the form of an aqueous solution, and can have a concentration of 1M or more (e.g., 3M or more, 6M or more, 9M or more, or 12M or more) and/or 14M or less (e.g., 12M or less, 9M or less, 6M or less, or 3M or less). In some embodiments, the aqueous sulfuric acid has a concentration of between 1M and 9M (e.g., between 1M and 6M, or between 3M and 6M). The concentration of the aqueous acid solution can range from 0.1 M to 10 M (e.g., from 1 M to 10 M, or from 4 M to 8 M). A preferred acid solution is 6 M sulfuric acid. As sulfuric acid is often used in the synthesis of untreated manganese dioxides, a sulfuric acid solution used in the acid treatment can be recycled and reused in the manufacturing process, thereby providing a more environmentally friendly process.

The manganese dioxide can be stirred with aqueous sulfuric acid at below room temperature (e.g., below 21° C.). In some embodiments, the acid-treatment temperature is 20° C. or less (e.g., 19° C. or less, 15° C. or less, 10° C. or less, five ° C. or less, or three ° C. or less) and/or 0° C. or more (e.g., three ° C. or more, five ° C. or more, 10° C. or more, 15° C. or more, or 19° C. or more). For example, the acid-treatment temperature can be between 0 and five ° C. (e.g., between 0 and 10° C., between 0 and 15° C., between 0 and two ° C., or between five and 10° C.). A low temperature can decrease the likelihood of generation of beta-$MnO_2$ or pyrolusite fractions, or generations of partially oxidized manganese ions. A low temperature can encourage reprecipitation of Mn(IV) ions.

The manganese dioxide can be stirred with the aqueous sulfuric acid for a duration of time of one hour or more (e.g., two hours or more, five hours or more, 12 hours or more, or 20 hours or more) and/or 24 hours or less (e.g., 20 hours or less, 12 hours or less, five hours or less, or two hours or less). In some embodiments, stirring with aqueous sulfuric acid can last from one to 24 hours (e.g., one to 12 hours, one to 6 hours, one to three hours, or 6 to 12 hours). Acid exposure duration can depend on the concentration of the acid. For example, when a more concentrated acid is used, the duration of acid exposure can be relatively short (e.g., one hour, two hours, or three hours). As an example, when a less concentrated acid is used, the duration of acid exposure can be relatively long (e.g., 24 hours, 18 hours, or 12 hours). The amount of manganese dioxide can affect the duration of acid exposure, for example, a relatively small amount of manganese dioxide can be exposed to acid for a relatively short duration, and a relatively large amount of manganese dioxide can be exposed for a relatively long duration to acid. In some embodiments, the temperature of acid treatment can affect the acid exposure duration. For example, a higher temperature of acid treatment can decrease the duration of acid exposure, and a lower temperature of acid treatment can increase the duration of acid exposure.

After stirring the manganese dioxide with aqueous sulfuric acid, the manganese dioxide can be isolated (e.g., by filtration, by sedimentation and decantation), washed repeatedly with portions of water (e.g., de-ionized water, distilled water) until the washings have a final pH of 4 or more (e.g., 5 or more, 6 or more, or 7 or more) and/or 8 or less (e.g., 7 or less, 6 or less, 5 or less, or 4 or less). In some embodiments, the final pH of the water washing is between two and seven (e.g., between three and seven, between four and seven, or between five and seven). In some embodiments, the solid manganese dioxide can be washed with an aqueous solution of an alkaline base, for example, NaOH, KOH, $NH_4OH$. The base solution can have a concentration of about 0.1 M or more (e.g., 0.2 M or more, 0.5 M or more, 0.7 M or more, or 1 M or more) and/or 2 M or less (e.g., 1 M or less, 0.7 M or less, 0.5 M or less, or 0.2 M or less). The pH of the alkaline base washings can be 8 or more (e.g., 9 or more, 10 or more, or 11 or more) and/or 12 or less (e.g., 11 or less, 10 or less, 9 or less, or 8 or less). The final pH of the water washing can be measured by a pH-meter.

After washing with water and/or base solution, the solid manganese dioxide is dried. For example, the manganese dioxide can be dried at a temperature of between 40° C. and 100° C. (e.g., between 50° C. and 80° C., or at about 50° C., at about 60° C., at about 70° C., at about 80° C., or at about 90° C.) under ambient atmosphere or an inert atmosphere (e.g., nitrogen, argon). The dried manganese dioxide can have a final water-content of between 1 wt % and 5 wt %. In some embodiments, the manganese dioxide can be dried under vacuum, with or without heating.

In some embodiments, the entire acid treatment process including the steps of washing and drying can be repeated multiple times, for example, two times or more or three times or more. The manganese dioxide powder resulting from repeated acid treatment can have greater purity, a greater specific surface area, and/or larger average pore diameter.

Changes in a microstructure of the manganese dioxide such as particle size distribution, micro-porosity, and surface area can change the performance of the manganese dioxide in a cell. In some embodiments, to improve the performance of the manganese dioxide in a cell, in some embodiments, mixtures of manganese dioxides having different average particle size distributions are selected to tune the packing density of commercial EMD. Smaller average particle sizes can be generated by milling an untreated manganese dioxide prior to acid treatment. In some embodiments, when smaller particles are generated by milling, the electrochemical activity could be degraded, for example, due to reduction of the Mn(IV) on the surface of manganese dioxide particles. However, the electrochemical activity degradation can be compensated by an increase in electrochemical capacity during acid treatment of manganese dioxide.

In some embodiments, a mixture of milled acid-treated manganese dioxide and a companion manganese dioxide (acid-treated or non-acid-treated) that has not been milled can be assembled into a cathode. The components of the mixture can have preserved micro-porosity as the components can be mixed without vigorous mechanical blending. In some embodiments, a milled manganese dioxide has an average particle diameter of 20 micrometers or less (e.g., 10 micrometers or less, or five micrometers or less). A companion manganese dioxide can have an average particle diameter of 40 micrometers or more (e.g., 50 micrometers or more, or 60 micrometers or more). In a cathode, the mixture can have enhanced packing compared to cathode including a manganese dioxide that is milled or a cathode including a manganese dioxide that is not milled. For example, the milled acid-treated manganese dioxide can pack into interstitial spaces of a companion manganese dioxide having larger particle sizes. The amount of milled acid-treated manganese dioxide to incorporate into a cathode can depend on the particle size of the companion manganese dioxide. For example, a cathode having a companion manganese dioxide of relatively large particle size can have a relatively large proportion of a milled acid-treated manganese dioxide. In some embodiments, a blend can have a milled acid-treated manganese dioxide to companion manganese dioxide weight ratio of 9:1 or less (e.g., 4:1 or less, 7:3 or less, or 1:1 or less) and/or 1:19 or more (e.g., 1:9 or more, 1:4 or more, 3:7 or more, 1:1 or more). For example, the blend can include 5% or more (e.g., 10% or more, 20% or more, or 30% or more, or 50% or more) and/or 90% or less (e.g., 80% or less, 70% or less, 50% or less) by weight of milled acid-treated manganese dioxide.

Figure 2:
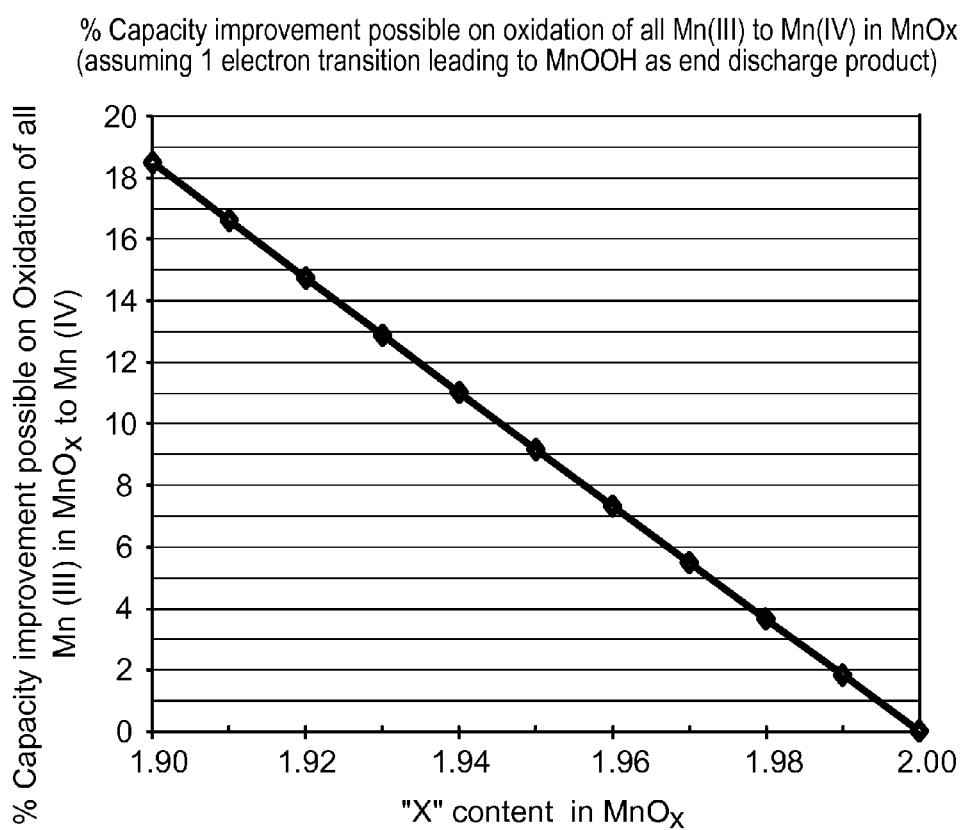
FIG. 2 is a plot of percentage of possible capacity increase in a manganese dioxide denoted by formula $MnO_x$ when Mn(III) is oxidized to Mn(IV)

Referring to FIG. 2, a theoretically possible percent increase in capacity for manganese dioxide following acid treatment is shown. Formula $MnO_x$ represents manganese dioxide having varying ratios of Mn(III) to Mn(IV), where the amount of Mn(IV) in the $MnO_x$ is calculated from 2x-3, and Mn(III) in the $MnO_x$ is calculated from 4-2x. The theoretically possible increase in capacity is calculated based on an assumption that all of the Mn(III) in $MnO_x$ is oxidized to Mn(IV). In FIG. 2, the value of x in $MnO_x$ is plotted on the x-axis and the Y-axis corresponds to a percent improvement in theoretical capacity as a function of x. In some embodiments, the x value in $MnO_x$ is 1.90 or greater (e.g., 1.92 or greater, 1.94 or greater, 1.96 or greater, 1.97 or greater, 1.98 or greater, or 1.99 or greater). When treated with acid, the acid-treated manganese dioxide includes a decreased amount of Mn(III) and an increased amount of Mn(IV) compared to the untreated $MnO_x$. In some embodiments, the acid-treated manganese dioxide includes a Mn(III) content of three percent or less by weight (e.g., two percent or less by weight, or one percent or less by weight).

In some embodiments, acid treatment can increase the amount of protons in a manganese dioxide. The proton can be part of water molecules in a crystal lattice, and can be determined by thermogravimetric analysis ("TGA") and neutron activation. For example, the acid-treated manganese dioxide crystal lattice can include proton content increase of between three percent or more (e.g., five percent or more, eight percent or more, or 10 percent or more) and/or 15 percent or less (e.g., 10 percent or less, eight percent or less, or five percent or less) compared to the proton content of an untreated manganese dioxide. As an example, the acid-treated manganese dioxide crystal lattice can include a proton content increase of about 15 percent (e.g., about 10 percent, or about five percent) compared to the proton content of an untreated manganese dioxide. An increased proton content can indicate an increased water content in the acid-treated manganese dioxide. An increased water content can lead to an increased capacity in a cathode incorporating the acid-treated manganese dioxide.

Acid treatment can decrease the impurity content of a manganese dioxide. In some embodiments, acid treatment can provide a relatively cost effective method to purify manganese dioxide made by less pure precursor materials. For example, a commercial manganese dioxide can include impurities such as Fe, Na, Ca, Al, Co, Mo, Cr, Cu, Pb, V, Ni, Sb, As, and Ge. After a manganese dioxide has been acid-treated, the amount of Fe impurity can be less than 20 ppm; the amount of Na can be less than 500 ppm; the amount of Ca can be less than 100 ppm; the amount of Al, Co, Mo, Cr, Cu, Pb, V, and Ni can each be independently less than one ppm; and the amount of Sb, As, and Ge can be each independently less than 0.2 ppm.

Physical, microstructural, and chemical properties of acid-treated manganese dioxide can be obtained using a variety of known methods. For example, X-ray powder diffraction patterns can be measured with an X-ray diffractometer (e.g., Bruker D-8 Advance X-ray diffractometer, Rigaku Miniflex diffractometer) using Cu $K_\alpha$ or Cr $K_\alpha$ radiation by standard methods described, for example, by B. D. Cullity and S. R. Stock (*Elements of X-ray Diffraction*, $3^{rd}$ ed., New York: Prentice Hall, 2001). The cubic unit cell constant, $a_o$, can be determined by Rietveld analysis of the powder diffraction data. The X-ray crystallite size also can be evaluated by analysis of peak broadening in a diffraction pattern containing an internal Si standard using the single-peak Scherrer method or the Warren-Averbach method as discussed in detail, for example, by H. P. Klug and L. E. Alexander (*X-ray Diffraction Procedures for Polycrystalline and Amorphous Materials*, New York: Wiley, 1974, 618-694).

In some embodiments, the acid-treated manganese dioxide has a BET surface area increase of 5 percent or more (e.g., 5 percent or more, 10 percent or more, 15 percent or more) relative to the BET surface area an untreated manganese dioxide. An increased BET surface area can provide the acid-treated manganese dioxide with higher reaction kinetics during discharge that manifests in an increased average discharge voltage in the range 0 to 0.1V. The specific surface areas of the acid-treated manganese dioxide can be determined by the multipoint B.E.T. $N_2$ adsorption isotherm method described, for example, by P. W. Atkins (*Physical Chemistry*, $5^{th}$ edn., New York: W. H. Freeman & Co., 1994, pp. 990-992) and S. Lowell et al. (*Characterization of Porous Solids and Powders: Powder Surface Area and Porosity*, Dordrecht, The Netherlands: Springer, 2006, pp. 58-80). The B.E.T. surface area measures the total surface area on the exterior surfaces of particles and includes that portion of the surface area defined by open pores within the particle accessible for gas adsorption and desorption. In some embodiments, the specific surface area of acid-treated manganese dioxide can be substantially greater than those of the untreated manganese dioxide. An increase in specific surface area can be correlated with an increase in surface roughness and porosity, which can be assessed by analyzing the particle microstructures of the manganese dioxide powders as imaged by scanning electron microscopy (e.g., SEM micrographs at about 10,000× magnification).

Porosimetric measurements can be conducted on the acid-treated or untreated manganese dioxide powders to determine cumulative pore volumes, average pore sizes (i.e., diameters), and pore size distributions. Pore sizes and pore size distributions can be calculated by applying various models and computational methods (e.g., BJH, DH, DR, HK, SF, etc.) for analysis of data from measurement of $N_2$ adsorption and/or desorption isotherms as discussed, for example, by S. Lowell et al. (*Characterization of Porous Solids and Powders: Powder Surface Area and Porosity*, Dordrecht, The Netherlands: Springer, 2006, pp. 101-156).

Mean particle sizes and size distributions for the acid-treated or untreated manganese dioxide can be determined with a laser diffraction particle size analyzer (e.g., a Sympa-Tec Helos particle size analyzer equipped with a Rodos dry powder dispensing unit) using algorithms based on Fraunhofer or Mie theory to compute the volume distribution of particle sizes and mean particle sizes. Particle size distribution and volume distribution calculations are described, for example, in M. Puckhaber and S. Rothele (Powder Handling & Processing, 1999, 11(1), 91-95 and European Cement Magazine, 2000, 18-21). Typically, the acid-treated or untreated manganese dioxide can consist of loose agglomerates or sintered aggregates (i.e., secondary particles) composed of much smaller primary particles. Such agglomerates and aggregates are readily measured by a particle size analyzer. The average size of the primary particles can be determined by microscopy (e.g., SEM, TEM).

True densities for the acid-treated or untreated manganese dioxide can be measured by a He gas pycnometer (e.g., Quantachrome Ultrapyc Model 1200e) as described in general by P. A. Webb ("Volume and Density Determinations for Particle Technologists", Internal Report, Micromeritics Instrument Corp., 2001, pp. 8-9) and in, for example, ASTM Standard D5965-02 ("Standard Test Methods for Specific Gravity of Coating Powders", ASTM International, West Conshohocken, Pa., 2007) and ASTM Standard B923-02 ("Standard Test Method for Metal Powder Skeletal Density by Helium or Nitrogen Pycnometry", ASTM International, West Conshohocken, Pa., 2008). True density is defined, for example, by the British Standards Institute, as the mass of a particle divided by its volume, excluding open pores and closed pores.

In addition, elemental compositions of the acid-treated or untreated manganese dioxide can be determined by inductively coupled plasma atomic emission spectroscopy (ICP-AES) and/or by atomic absorption spectroscopy (AA) using standard methods as described in general, for example, by J. R. Dean (*Practical Inductively Coupled Plasma Spectroscopy*, Chichester, England: Wiley, 2005, 65-87) and B. Welz & M. B. Sperling (*Atomic Absorption Spectrometry*, $3^{rd}$ ed., Weinheim, Germany: Wiley VCH, 1999, 221-294). Further, the average oxidation state (i.e., valence) of Mn in the acid-treated or untreated manganese dioxide can be determined by chemical titrimetry using ferrous ammonium sulfate and standardized potassium permanganate solutions as described, for example by A. F. Dagget and W. B. Meldrun (*Quantitative Analysis*, Boston: Heath, 1955, 408-409).

When incorporated into a battery (e.g., a button cell), in some embodiments, the acid-treated manganese dioxide provides a specific capacity increase of at least 3% (e.g., at least 5%, at least 10%, at least 15%) and/or at most 20% (e.g., at most 5%, at most 10%, at most 20%) relative to the specific capacity of an untreated manganese dioxide (e.g., in a button cell). In some embodiments, the acid-treated manganese dioxide can provide batteries having increased capacities at high or low discharge voltage regions. In some embodiments, a battery having the acid-treated manganese dioxide has a battery discharge voltage increase of between 0.5 and 3.0 percent over a range of 0.8 V to 1.75 V relative to a the battery discharge voltage of a battery having an untreated manganese dioxide.

The acid-treated manganese dioxide can provide lower in-cell gas volumes as the battery discharges or is stored in undischarged condition, compared to a battery including an untreated manganese dioxide. For example, a battery having an acid-treated manganese dioxide can have a decrease in in-cell gas volume of 0% or more (e.g., 5% or more, 10% or more, or 20 or more) and/or 30% or less (e.g., 20% or less, 10% or less, or 5% or less) compared to a battery having an untreated manganese dioxide. Without wishing to be bound by theory, it is believed that in-cell gas volumes are related to formation of manganate compounds. In some embodiments, the decrease in gassing amount can depend on an anode Zn particle size, cell design, state of cell discharge percentage, cell discharge rate, and the cell storage temperature.

The acid-treated manganese dioxide can have an increased amount of absorbed moisture and total structural water compared to an untreated manganese dioxide. For example, an acid-treated manganese dioxide dried at 60° C. can have a total free moisture (absorbed and adsorbed moisture) in the range 1.3 to 1.5% as measured from a thermogravimetric analysis of up to 110° C. heating in air at a rate of 10° C./minute. A similar measurement for untreated manganese dioxide would give only about 1 to 1.30% moisture. In some embodiments, the acid-treated manganese dioxide can have a structural water content increase of 0.5% or more (e.g., 1% or more, or 2% or more) and/or 3% or less (e.g., 2% or less, or 1% or less) compared to a battery having an untreated manganese dioxide. In a specific embodiment, the total amount of hydrogen atoms as measured from neutron activation can show an increase of about 317 ppm for the acid treated manganese dioxide in comparison to untreated manganese dioxide (3567 ppm vs. 3250 ppm). The structural water (lattice moisture) content measured for acid treated manganese dioxide was around 3.37 to 3.45% versus ~3-3.30% of that of untreated manganese dioxide, giving an increase of about 2% or more (e.g., 2% or more, and 15% or more). The total structural water is measured using a convection oven, a muffle furnace, a desiccator, a porcelain crucible, and an analytical balance. The crucible is preheated at 400° C. for 30 minutes. It is then cooled in a desiccator for 10 minutes and weight ($W_1$) is determined. 10 g of a well mixed sample is weighed into a pre-dried crucible and the weight is recorded to 4 decimal places ($W_2$). The sample is placed in a 110° C. convection oven and heated to constant weight (minimum 18-h). The sample was placed in the crucible in a desiccator for 30 minutes and weight ($W_3$) is determined. The weight loss is determined and % moisture at 110° C. is calculated. The crucible is placed in the muffle furnace, set at 400° C., for 2-h and 40 minutes. It is then removed from the furnace and cooled for 5 minutes. The crucible was then placed in a desiccator for 30 minutes. Weight ($W_4$) is determined, and the weight loss at 400° C. is determined and calculated as % lattice moisture.

Calculations:

$$\% \text{ Moisture at } 110° \text{ C.} = (W_2 - W_3)/(W_2 - W_1) \times 100\%$$

$$\% \text{ Lattice Moisture at } 400° \text{ C.} = (W_3 - W_4)/(W_3 - W_1) \times 100$$

Where:
$W_1$=Weight of pre-dried crucible.
$W_2$=Weight of sample and crucible.
$W_3$=Weight of sample after 110° C. and crucible.
$W_4$=Weight of sample after 400° C. and crucible.

The acid-treated manganese dioxide can have an increased cumulative micro-porous volume (e.g., 0.0037 cc/g Vs 0.002 cc/g) as compared to an untreated manganese dioxide. The acid-treated manganese dioxide can have an increased cumulative microporosity volume compared to an untreated manganese dioxide. For example, a battery having an acid-treated manganese dioxide can have an increase in cumulative microporosity volume of 30% or more (e.g., 50% or more, 70% or more, or 80% or more) and/or 95% or less (e.g., 80% or less, 70% or less, or 50% or less) compared to a battery having an untreated manganese dioxide.

When incorporated into a battery, in some embodiments, the acid-treated manganese dioxide can provide a cell having an initial open circuit voltage of 1.69V or more (e.g., 1.7 V or more, or 1.75 V or more) for a freshly acid-treated manganese dioxide. When subjected to a high rate discharge performance test (e.g., a digital camera test), the battery including an acid-treated manganese dioxide can have a performance increase of 10 percent or more (e.g., 15 percent or more, 20 percent or more, 25 percent or more, or 26 percent or more) and/or 30 percent or less (e.g., 26 percent or less, 25 percent or less, 20 percent or less, or 15 percent or less) compared to the performance of a battery including a corresponding untreated manganese dioxide. In a digital cameral test, the discharge capacity of a battery cathode is measured by discharging the battery using a test that simulates consumer use with a digital camera. For example, a 1500 mW load can be applied to the battery for 2 seconds followed by a 650 mW load held for 28 seconds. This cycle can be repeated 10 times or for a total of 5 minutes, then the battery is allowed to rest for 55 minutes. This 60 minute cycle can be repeated and continued until the battery load voltage first reaches 1.05V. In some embodiments, medium and/or low rate performance of a battery including an acid-treated manganese dioxide can improved compared to a battery including an untreated manganese dioxide.

While the foregoing describes acid treatment with aqueous sulfuric acid, in some embodiments, other mineral acids can be used for acid treatment of manganese dioxide. For example, instead of or in addition to sulfuric acid, an aqueous solution of a strong, oxidizing mineral acid, for example, nitric acid, hydrochloric acid, perchloric acid, and oleum (i.e., fuming sulfuric acid) can be used to remove metallic impurities and increase average Mn oxidation state. In some embodiments, acid treatment with nitric acid or hydrochloric acid can occur at a higher temperature than acid treatment with sulfuric acid. For example, the temperature of acid treatment with hydrochloric acid or nitric acid can be 45° C. or more (e.g., 60° C. or more, 75° C. or more, or 85° C. or more) and/or 95° C. or less (e.g., 85° C. or less, 75° C. or less, or 60° C. or less). In some embodiments, acid treatment with nitric acid or hydrochloric acid can occur for a longer duration than acid treatment with sulfuric acid. For example, the duration can last 24 hours or more (e.g., 30 hours or more, 36 hours or more, or 40 hours or more) and/or 48 hours or less (e.g., 40 hours or less, 36 hours or less, 30 hours or less).

When an acid-treated manganese dioxide is incorporated into a battery, in some embodiments, cathode 12 includes between 50 percent and 95 percent by weight (e.g., between 60 percent and 90 percent by weight, between 70 percent and 85 percent by weight) of the acid-treated manganese dioxide by weight. Cathode 12 can include greater or equal to 50, 60, 70, 80, or 90 percent by weight, and/or less than or equal to 95, 90, 80, 70, or 60 percent by weight of the acid-treated manganese dioxide.

The acid-treated manganese dioxide can make up all of the active material of cathode 12, or a portion of the active material of cathode 12. For example, as the active material of cathode 12, the acid-treated manganese dioxide can be mixed with a non-stoichiometric metal oxide (e.g., $Li_{1-x}H_yNiO_2$; $Li_{1-x}H_y(Ni,Co)_{1-z}O_2$; $A_{1-x}H_yM^a_{1-z-t}M^b_zM^c_tO_2$, where A is an alkali metal, H is a proton, $M^a$ and $M^b$ are transition metals, $M^c$ is a dopant such as Mg, Ca, Sr, Ba, Al, Cr, Y, Zr, Nb, Hf, and/or Ti, y is less than or equal to x, and $z+t \leq 1$, the transition metals $M^a$ and $M^b$ in the non-stoichiometric metal oxide can include a transition metal such as Ni, Co, Mn, Al, and/or Fe). Non-stoichiometric metal oxides are described, for example, in concurrently filed patent application hereby incorporated by reference in its entirety. Other examples of suitable cathode active materials that can be used in combination with the acid-treated manganese dioxide include β-NiOOH, γ-NiOOH, AgO, $Ag_2O$, $AgNiO_2$, and/or $AgCoO_2$.

In some embodiments, to enhance its bulk electrical conductivity and stability, the acid-treated manganese dioxide particles can include an electrically conductive surface coating. Increasing the overall electrical conductivity of the cathode can enhance the total discharge capacity and/or average discharge voltage (e.g., at relative low discharge rates), as well as enhance the effective cathode utilization (e.g., at relative high discharge rates). The conductive surface coating can include a carbonaceous material, such as a natural or synthetic graphite, a carbon black, a partially graphitized carbon black, and/or an acetylene black. The conductive surface coating can include a metal, such as gold or silver and/or a conductive or semiconductive metal oxide, such as cobalt oxide (e.g., $Co_3O_4$), cobalt oxyhydroxide, silver oxide, antimony-doped tin oxide, zinc antimonate, indium oxide or indium tin oxide. The surface coating can be applied or deposited, for example, using solution techniques including electrodeposition, electroless deposition, by vapor phase deposition (e.g., sputtering, physical vapor deposition, or chemical vapor deposition) or by direct coating conductive particles to the surface of the active particles using a binder and/or coupling agent, as described, for example, by J. Kim et al. (Journal of Power Sources, 2005, 139, 289-294) and R. Dominko et al. (Electrochemical and Solid State Letters, 2001, 4(11), A187-A190). A suitable conductive coating thickness can be provided by applying the conductive surface coating at between 3 and 10 percent by weight (e.g., greater than or equal to 3, 4, 5, 6, 7, 8, or 9 percent by weight, and/or less than or equal to 10, 9, 8, 7, 6, 5, or 4 percent by weight) relative to the total weight of the cathode active material.

In addition, as indicated above, cathode 12 can include an electrically conductive additive capable of enhancing the bulk cathode electrical conductivity. The conductive additive can be blended with the acid-treated manganese dioxide prior to fabrication of cathode 12. Examples of conductive additives include graphite, carbon black, silver powder, gold powder, nickel powder, carbon fibers, carbon nanofibers, and/or carbon nanotubes. Preferred conductive additives include graphite particles, graphitized carbon black particles, carbon nanofibers, vapor phase grown carbon fibers, and single and multiwall carbon nanotubes. In certain embodiments, the graphite particles can be natural or non-synthetic, nonexpanded graphite particles, for example, NdG MP-0702X available from Nacional de Grafite (Itapecirica, Brazil) and FormulaBT™ grade available from Superior Graphite Co. (Chicago, Ill.). In other embodiments, the graphite particles can be expanded natural or expanded synthetic graphite particles, for example, Timrex® BNB90 available from Timcal, Ltd. (Bodio, Switzerland), WH20 or WH20A grade from Chuetsu Graphite Works Co., Ltd. (Osaka, Japan), and ABG grade available from Superior Graphite Co. (Chicago, Ill.). In yet other embodiments, the graphite particles can be synthetic, non-expanded graphite particles, for example, Timrex® KS4, KS6, KS15, MX15 available from Timcal, Ltd. (Bodio, Switzerland). The graphite particles can be oxidation-resistant, synthetic, non-expanded graphite particles. The term "oxidation resistant graphite" as used herein refers to a synthetic graphite made from high purity carbon or carbonaceous materials having a highly crystalline structure. The use of oxidation resistant graphite in blends with acid-treated manganese dioxide can reduce the rate of graphite oxidation by acid-treated manganese dioxide and/or by other highly oxidizing cathode active materials. Suitable oxidation resistant graphites include, for example, SFG4, SFG6, SFG10, SFG15 available from Timcal, Ltd., (Bodio, Switzerland). Carbon nanofibers are described, for example, in commonly-assigned U.S. Ser. No. 09/658,042, filed Sep. 7, 2000 and U.S. Ser. No. 09/829,709, filed Apr. 10, 2001. Cathode 12 can include between 3% and 35%, between 4% and 20%, between 5% and 10%, or between 6% and 8% by weight of conductive additive.

An optional binder can be added to cathode 12 to enhance its structural integrity. Examples of binders include polymers such as polyethylene powders, polypropylene powders, polyacrylamides, and various fluorocarbon resins, such as polyvinylidene difluoride (PVDF) and polytetrafluoroethylene (PTFE). An example of a suitable polyethylene binder is available from Dupont Polymer Powders (Sari, Switzerland) under the tradename Coathylene HX1681. Cathode 12 can include, for example, from 0.05% to 5% or from 0.1% to 2% by weight of binder relative to the total weight of the cathode. Cathode 12 can also include other optional additives.

The electrolyte solution also is dispersed throughout cathode 12, e.g., at about 5-7 percent by weight. Weight percentages provided above and below are determined after the electrolyte solution was dispersed in cathode 12. The electrolyte solution can be any of the electrolyte solutions commonly used in alkaline batteries. The electrolyte solution can be an aqueous solution of an alkali metal hydroxide such as KOH, NaOH or a mixture of alkali metal hydroxides, for example, KOH and NaOH. For example, the aqueous alkali metal hydroxide solution can include between about 20 and about 55 percent (e.g., between about 30 and about 50 percent, or between about 33 and about 45 percent) by weight of the alkali metal hydroxide. In some embodiments, the aqueous alkali metal hydroxide can include about 37% by weight KOH (i.e., about 9 M KOH). In some embodiments, the electrolyte solution also can include from 0 to about 6 percent by weight of a metal oxide, such as zinc oxide, for example, about 2 percent by weight zinc oxide.

Anode 14 can be formed of any of the zinc-based materials conventionally used in alkaline battery anodes. For example, anode 14 can be a gelled zinc anode that includes zinc metal particles and/or zinc alloy particles, a gelling agent, and minor amounts of additives, such as a gassing inhibitor. A portion of the electrolyte solution can be dispersed throughout the anode. The zinc particles can be any of the zinc-based particles conventionally used in gelled zinc anodes. The zinc-based particles can be formed of a zinc-based material, for example, zinc or a zinc alloy. Generally, a zinc-based particle formed of a zinc-alloy is greater than 75% zinc by weight, typically greater than 99.9% by weight zinc. The zinc alloy can include zinc (Zn) and at least one of the following elements: indium (In), bismuth (Bi), aluminum (Al), calcium (Ca), lead (Pb), gallium (Ga), lithium (Li), magnesium (Mg), and tin (Sn). The zinc alloy typically is composed primarily of zinc and preferably can include metals that can inhibit gassing, such as indium, bismuth, aluminum and mixtures thereof. As used herein, gassing refers to the evolution of hydrogen gas resulting from a reaction of zinc metal or zinc alloy with the electrolyte. The presence of hydrogen gas inside a sealed battery is undesirable because a pressure buildup can cause leakage of electrolyte. Preferred zinc-based particles are both essentially mercury-free and lead-free. Examples of zinc-based particles include those described in U.S. Pat. Nos. 6,284,410; 6,472,103; 6,521,378; and commonly-assigned U.S. application Ser. No. 11/001,693, filed Dec. 1, 2004, all hereby incorporated by reference. The terms "zinc", "zinc powder", or "zinc-based particle" as used herein shall be understood to include zinc alloy powder having a high relative concentration of zinc and as such functions electrochemically essentially as pure zinc. The anode can include, for example, between about 60% and about 80%, between about 62% and 75%, between about 63% and about 72%, or between about 67% and about 71% by weight of zinc-based particles. For example, the anode can include less than about 72%, about 70%, about 68%, about 64%, or about 60%, or about 55% by weight zinc-based particles.

The zinc-based particles can be formed by various spun or air blown processes. The zinc-based particles can be spherical or non-spherical in shape. Non-spherical particles can be acicular in shape (i.e., having a length along a major axis at least two times a length along a minor axis) or flake-like in shape (i.e., having a thickness not more than 20% of the length of the maximum linear dimension). The surfaces of the zinc-based particles can be smooth or rough. As used herein, a "zinc-based particle" refers to a single or primary particle of a zinc-based material rather than an agglomeration or aggregation of more than one particle. A percentage of the zinc-based particles can be zinc fines. As used herein, zinc fines include zinc-based particles small enough to pass through a sieve of 200 mesh size (i.e., a sieve having a Tyler standard mesh size corresponding to a U.S. Standard sieve having square openings of 0.075 mm on a side) during a normal sieving operation (i.e., with the sieve shaken manually). Zinc fines capable of passing through a 200 mesh sieve can have a mean average particle size from about 1 to 75 microns, for example, about 75 microns. The percentage of zinc fines (i.e., −200 mesh) can make up about 10 percent, 25 percent, 50 percent, 75 percent, 80 percent, 90 percent, 95 percent, 99 percent or 100 percent by weight of the total zinc-based particles. A percentage of the zinc-based particles can be zinc dust small enough to pass through a 325 mesh size sieve (i.e., a sieve having a Tyler standard mesh size corresponding to a U.S. Standard sieve having square openings of 0.045 mm on a side) during a normal sieving operation. Zinc dust capable of passing through a 325 mesh sieve can have a mean average particle size from about 1 to 35 microns (for example, about 35 microns). The percentage of zinc dust can make up about 10 percent, 25 percent, 50 percent, 75 percent, 80 percent, 90 percent, 95 percent, 99 percent or 100 percent by weight of the total zinc-based particles. Even very small amounts of zinc fines, for example, at least about 5 weight percent, or at least about 1 weight percent of the total zinc-based particles, can have a beneficial effect on anode performance. The total zinc-based particles in the anode can consist of only zinc fines, of no zinc fines, or mixtures of zinc fines and dust (e.g., from about 35 to about 75 weight percent) along with larger size (e.g., −20 to +200 mesh) zinc-based particles. A mixture of zinc-based particles can provide good overall performance with respect to rate capability of the anode for a broad spectrum of discharge rate requirements as well as provide good storage characteristics. To improve performance at high discharge rates after storage, a substantial percentage of zinc fines and/or zinc dust can be included in the anode.

In some embodiments, anode 14 can include a gelling agent, for example, a high molecular weight polymer that can provide a network to suspend the zinc particles in the electrolyte. Examples of gelling agents include polyacrylic acids, grafted starch materials, salts of polyacrylic acids, polyacrylates, carboxymethylcellulose, a salt of a carboxymethylcellulose (e.g., sodium carboxymethylcellulose) and/or combinations thereof. Examples of such polyacrylic acids include Carbopol 940 and 934 commercially available from B. F. Goodrich Corp. and Polygel 4P available from 3V. An example of a grafted starch material is Waterlock A221 or A220 commercially available from Grain Processing Corp. (Muscatine, Iowa). An example of a salt of a polyacrylic acid is Alcosorb G1 available from Ciba Specialties. The anode can include, for example, between about 0.05% and 2% by weight or between about 0.1% and 1% by weight of the gelling agent by weight.

Gassing inhibitors can include a metal such as bismuth, lead, tin, indium, aluminum or a mixture thereof added to the zinc anode in the form of an alloy. A gassing inhibitor also can include a soluble inorganic compound, such as a metal salt, for example, an indium or bismuth salt (e.g., indium sulfate, indium chloride, indium nitrate, bismuth nitrate). Alternatively, gassing inhibitors can be organic compounds, such as phosphate esters, ionic surfactants or nonionic surfactants. Examples of ionic surfactants are disclosed in, for example, U.S. Pat. No. 4,777,100, hereby incorporated by reference.

Separator 16 can have any of the conventional designs for primary alkaline battery separators. In some embodiments, separator 16 can be formed of two layers of a non-woven, non-membrane material with one layer being disposed along a surface of the other. To minimize the volume of separator 16 while providing an efficient battery, each layer of non-woven, non-membrane material can have a basic weight of about 54 grams per square meter, a thickness of about 5.4 mils when dry and a thickness of about 10 mils when wet. In these embodiments, the separator preferably does not include a layer of membrane material or a layer of adhesive between the non-woven, non-membrane layers. Typically, the layers can be substantially devoid of fillers, such as inorganic particles. In some embodiments, the separator can include inorganic particles. In other embodiments, separator 16 can include a layer of cellophane combined with a layer of non-woven material. The separator optionally can include an additional layer of non-woven material. The cellophane layer can be adjacent to cathode 12. Preferably, the non-woven material can contain from about 78% to 82% by weight polyvinylalcohol (PVA) and from about 18% to 22% by weight rayon and a trace amount of surfactant. Such non-woven materials are available from PDM under the tradename PA25. An example of a separator including a layer of cellophane laminated to one or more layers of a non-woven material is Duralam DT225 available from Duracell Inc. (Aarschot, Belgium).

In yet other embodiments, separator 16 can be an ion-selective separator. An ion-selective separator can include a microporous membrane with an ion-selective polymeric coating. In some cases, such as in rechargeable alkaline manganese dioxide cells, diffusion of soluble zincate ion, i.e., $[Zn(OH)_4]^{2-}$, from the anode to the cathode can interfere with the reduction and oxidation of manganese dioxide, thereby resulting in a loss of coulombic efficiency and ultimately in decreased cycle life. Separators that can selectively inhibit the passage of zincate ions, while allowing free passage of hydroxide ions are described in U.S. Pat. Nos. 5,798,180 and 5,910,366. An example of a separator includes a polymeric substrate having a wettable cellulose acetate-coated polypropylene microporous membrane (e.g., Celgard 3559, Celgard 5550, Celgard 2500, and the like) and an ion-selective coating applied to at least one surface of the substrate. Suitable ion-selective coatings include polyaromatic ethers (such as a sulfonated derivative of poly(2,6-dimethyl-1,4-phenyleneoxide)) having a finite number of recurring monomeric phenylene units each of which can be substituted with one or more lower alkyl or phenyl groups and a sulfonic acid or carboxylic acid group. In addition to preventing migration of zincate ions to the manganese dioxide cathode, the selective separator was described in U.S. Pat. Nos. 5,798,180 and 5,910,366 as capable of diminishing diffusion of soluble ionic species away from the cathode during discharge.

Alternatively or in addition, the separator can prevent substantial diffusion of soluble transition metal species (e.g., $Ag^+$, $Ag^{2+}$, $Cu^+$, $Cu^{2+}$, $Bi^{5-}$, and/or $Bi^{3+}$) away from the cathode to the zinc anode, such as the separator described in U.S. Pat. No. 5,952,124. The separator can include a substrate membrane such as cellophane, nylon (e.g., Pellon® sold by Freundenburg, Inc.), microporous polypropylene (e.g., Celgard® 3559 sold by Celgard, Inc.) or a composite material including a dispersion of a carboxylic ion-exchange material in a microporous acrylic copolymer (e.g., PD2193 sold by Pall-RAI, Inc.). The separator can further include a polymeric coating thereon including a sulfonated polyaromatic ether, as described in U.S. Pat. Nos. 5,798,180; 5,910,366; and 5,952,124.

In other embodiments, separator 16 can include an adsorptive or trapping layer. Such a layer can include inorganic particles that can form an insoluble compound or an insoluble complex with soluble transition metal species to limit diffusion of the soluble transition metal species through the separator to the anode. The inorganic particles can include metal oxide nanoparticles, for example, as $ZrO_2$ and $TiO_2$. Although such an adsorptive separator can attenuate the concentration of the soluble transition metal species, it may become saturated and lose effectiveness when high concentrations of soluble bismuth species are adsorbed. An example of such an adsorptive separator is disclosed in commonly assigned U.S. Ser. No. 10/682,740, filed on Oct. 9, 2003.

Battery housing 18 can be any conventional housing commonly used for primary alkaline batteries. The battery housing 18 can be fabricated from metal, for example, nickel-plated cold-rolled steel. The housing typically includes an inner electrically-conductive metal wall and an outer electrically non-conductive material such as heat shrinkable plastic. An additional layer of conductive material can be disposed between the inner wall of the battery housing 18 and cathode 12. This layer may be disposed along the inner surface of the wall, along the circumference of cathode 12 or both. This conductive layer can be applied to the inner wall of the battery, for example, as a paint or dispersion including a carbonaceous material, a polymeric binder, and one or more solvents. The carbonaceous material can be carbon particles, for example, carbon black, partially graphitized carbon black or graphite particles. Such materials include LB1000 (Timcal, Ltd.), Eccocoat 257 (W. R. Grace & Co.), Electrodag 109 (Acheson Colloids, Co.), Electrodag 112 (Acheson), and EB0005 (Acheson). Methods of applying the conductive layer are disclosed in, for example, Canadian Patent No. 1,263,697, which is hereby incorporated by reference.

The anode current collector 20 passes through seal 22 extending into anode 14. Current collector 20 is made from a suitable metal, such as brass or brass-plated steel. The upper end of current collector 20 electrically contacts the negative top cap 24. Seal 22 can be made, for example, of nylon.

Battery 10 can be assembled using conventional methods and hermetically sealed by a mechanical crimping process. In some embodiments, positive electrode 12 can be formed by a pack and drill method, described in U.S. Ser. No. 09/645,632, filed Aug. 24, 2000.

Battery 10 can be a primary electrochemical cell or in some embodiments, a secondary electrochemical cell. Primary batteries are meant to be discharged (e.g., to exhaustion) only once, and then discarded. In other words, primary batteries are not intended to be recharged. Primary batteries are described, for example, by D. Linden and T. B. Reddy (*Handbook of Batteries*, $3^{rd}$ ed., New York: McGraw-Hill Co., Inc., 2002). In contrast, secondary batteries can be recharged for many times (e.g., more than fifty times, more than a hundred times, more than a thousand times). In some cases, secondary batteries can include relatively robust separators, such as those having many layers and/or that are relatively thick. Secondary batteries can also be designed to accommodate changes, such as swelling, that can occur in the batteries. Secondary batteries are described, for example, by T. R. Crompton (*Battery Reference Book*, $3^{rd}$ ed., Oxford: Reed Educational and Professional Publishing, Ltd., 2000) and D.

Linden and T. B. Reddy (*Handbook of Batteries*, 3rd ed., New York: McGraw-Hill Co., Inc., 2002).

Battery 10 can have of any of a number of different nominal discharge voltages (e.g., 1.2 V, 1.5 V, 1.65 V), and/or can be, for example, a AA, AAA, AAAA, C, or D battery. While battery 10 can be cylindrical, in some embodiments, a battery can be non-cylindrical. For example, a battery 10 can be a coin cell, a button cell, a wafer cell, or a racetrack-shaped cell. In some embodiments, a battery 10 can be prismatic. In certain embodiments, a battery can have a rigid laminar cell configuration or a flexible pouch, envelope or bag cell configuration. In some embodiments, a battery can have a spirally wound configuration, or a flat plate configuration. Batteries are described, for example, in U.S. Pat. No. 6,783,893; U.S. Patent Application Publication No. 2007/0248879 A1, filed on Jun. 20, 2007; and U.S. Pat. No. 7,435,395.

EXAMPLES

The following examples are illustrative and not intended to be limiting.

Battery Assembly

Discharge performance of the cathode active materials was evaluated in alkaline button cells (e.g., 635-type). The cells were assembled in the following manner. A 10 g portion of the dried cathode active material powder was blended together with an oxidation-resistant synthetic graphite, for example, Timrex® SFG15 available from Timcal, Ltd. (Bodio, Switzerland) and a KOH electrolyte solution containing 38 wt % KOH and 2 wt % zinc oxide in a weight ratio of 75:20:5 to form a wet cathode mix. About 0.3-0.4 g of the wet cathode mix was pressed into a nickel grid welded to the bottom of the cathode can. A polymeric insulating seal was inserted into the cathode can. A disk of multilayer separator including a layer of cellophane bonded to a non-woven polymeric layer, for example, Duralam® DT225 from Duracell, Inc. (Aarshot, Belgium) was saturated with electrolyte solution and positioned on top the cathode with the cellophane layer facing the cathode. Additional electrolyte solution was added to the separator to ensure that the underlying cathode also was saturated. About 2.6 g of anode slurry containing zinc-based particles, electrolyte solution, a gelling agent, and a gassing inhibitor was applied to the upper surface of the separator. The anode can was positioned on top the cell assembly and was mechanically crimped to the cathode can with the interposed seal to hermetically close the cell.

Typically, cells were tested within 24 hours after fabrication and OCV measured immediately before discharge. Cells were discharged to a cutoff voltage of 0.8 V at a constant low discharge rate of about 10 mA/g active corresponding to a nominal C/35 discharge rate. As used herein, a C/35 discharge rate corresponds to the constant discharge rate at which the total cell capacity is discharged in 35 hours.

Example 1

Acid Treatment of Commercial Manganese Dioxide at Room Temperature 100 g of a commercial EMD (sample (a)) was treated with 1 liter of 6M $H_2SO_4$ acid at 23° C. to 25° C. for 12 hours, followed by washing with de-ionized water until the pH of the supernatant solvent was above the 3.5. The material was dried at 60-80° C. in ambient atmosphere to provide sample (b).

Example 2

Acid Treatment of Commercial Manganese Dioxide with Sulfuric Acid at Low Temperature About 100 g commercial EMD powder (e.g., Tronox, AB) was added with stirring to about 1 L of aqueous 6 M $H_2SO_4$ solution that had been pre-cooled to about 2 to 5° C. The mixture was maintained at about 2° C. and stirred for about 4-6 hours. After treatment was complete, the suspended solids were allowed to settle, and the clear supernatant liquid decanted. The solid acid-treated EMD was collected by vacuum filtration and washed with aliquots of deionized water until pH of the filtrate was nearly neutral (i.e., pH ~5-6), and the solid acid-treated EMD was then dried at 20° C. for about 24 hours in air to afford sample (c). Values for characteristic physical properties of acid-treated EMD powder are summarized in Table 1A.

A sample of dried, acid-treated EMD was blended manually using a mortar and pestle with a natural graphite (e.g., Nacionale de Grafite, MP-0702x) and 38% KOH electrolyte solution in a weight ratio of 75:20:5. Button cells were fabricated from the wet cathode mix in the general manner described above. Cells were tested within 24 hours after fabrication and OCV measured immediately before discharge. The cells including low temperature acid-treated EMD were discharged to a 0.8 V cutoff voltage at a constant low discharge rate of about 10 mA/g active corresponding to a nominal C/35 discharge rate. The average discharge capacity and average OCV values are given in Table 1A. The low rate discharge capacity typically ranges between about 286 and 296 mAh/g and is about 93-96% of the theoretical specific capacity of 307 mAh/g.

TABLE 1A

Properties of acid-treated EMD (c).
Properties of Acid-treated EMD

| | |
|---|---|
| Ave particle size (μm) | 40 |
| True density (g/cm³) | 4.31 |
| Tap density (g/cm³) | 2.4 |
| B.E.T. SSA (m²/g) | 37.0 |
| Ave pore size (Å) | 24 |
| Cumul. pore vol.(cc/g) | 0.0037 |
| Ave OCV(V) | 1.74 |
| Capacity to 0.8 V @10 mA/g (mAh/g) | 296 |

The procedure in Example 2 was repeated with 100 g of commercial EMD (sample(a)), with acid treatment at a temperature of 0 to 2° C. The resulting acid-treated EMD was washed with de-ionized water and dried in an oven to provide sample (c).

Example 3

Acid Treatment of Commercial Manganese Dioxide with Nitric Acid 100 g of the EMD commercial sample (a) was acid-treated with 1 L of 2M nitric acid at 85° C. for 2 hours, followed by de-ionized water washing until the supernatant liquid achieved a pH of about 4. The washed acid-treated EMD was collected and dried at 60-80° C. in ambient atmosphere to provide sample (d).

Example 4

Characterization of Samples (b), (c), and (d)

Figure 3:
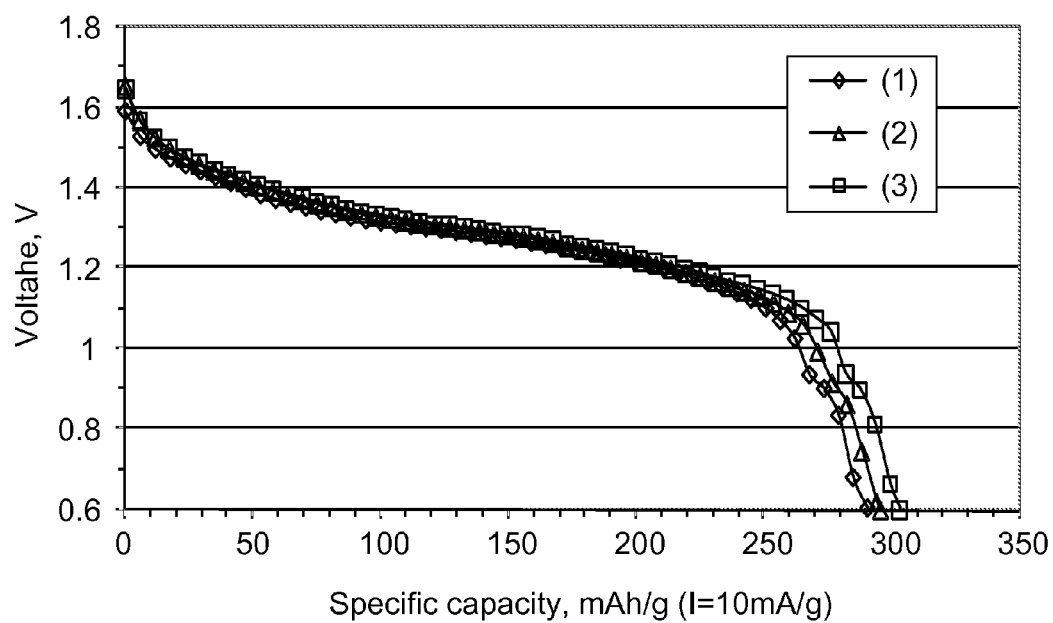
FIG. 3 is a plot showing voltage vs. specific capacity in button cells against a Zn anode for acid-treated and untreated manganese dioxide.
Figure 4:
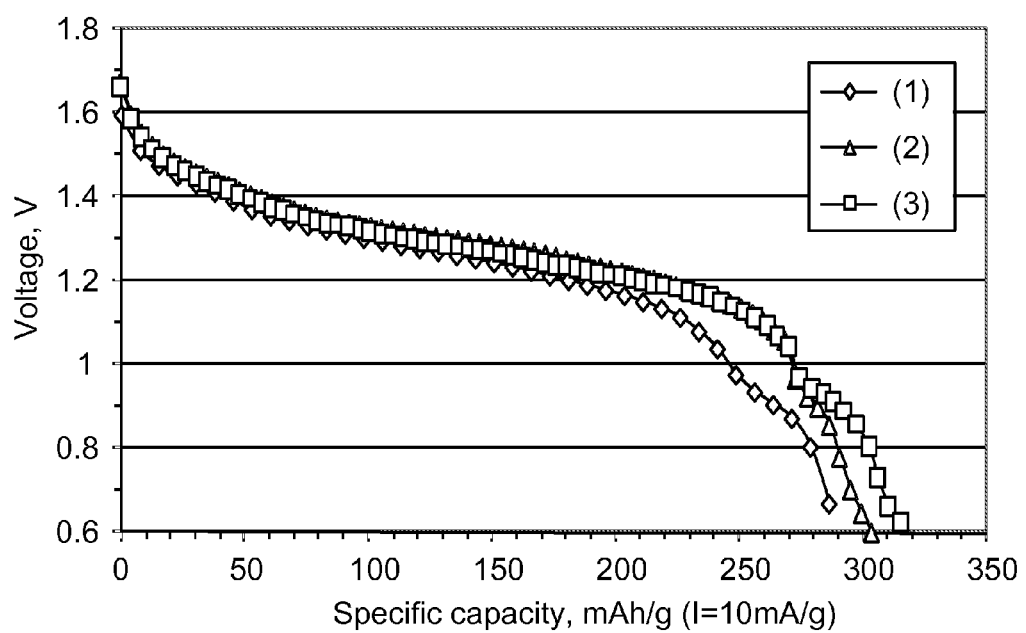
FIG. 4 is a plot of voltage vs. specific capacity in button cells against a Zn anode for performances of acid-treated and untreated commercial manganese dioxide samples.

Referring to FIGS. 3 and 4, plots of voltage vs. specific capacity for samples (b), (c), and (d) from Examples 1, 2, and 3, against a Zn anode from a button cell are shown. Referring to FIG. 3, (1) corresponds to sample (a), a commercial EMD (control); (2) corresponds to sample (b) obtained by treating sample (a) with sulfuric acid at 23° C.; and (3) corresponds to sample (c), obtained by treating sample (a) with sulfuric acid at 2° C. The commercial EMD sample showed an improved specific capacity and voltage when acid-treated with sulfuric acid (Examples 1 and 2). The performance improvement was further enhanced for Example 2 where the acid washing was done at 0 to 2° C., when compared to Example 1 where the acid treatment was done at room temperature.

Referring to FIG. 4, (1) corresponds to an untreated commercial EMD sample (a), (2) corresponds to sample (c), obtained by treating commercial EMD sample (a) with sulfuric acid at 2° C., and (3) is sample (d), obtained by treating commercial EMD sample (a) with nitric acid at 85° C. FIG. 4 showed that the capacity and voltage of commercial sample (a) improved when sample (a) was treated with sulfuric acid at low temperature, or in nitric acid. The button cell test results were also confirmed in larger scaled AA batteries.

Table 1B showed the electrochemical properties of acid-treated manganese dioxides (c) and (d) compared to commercial manganese dioxide (a).

85-90° C. using a hydrothermal set-up. In a chemical oxidation of an aqueous solution of manganese sulfate with a strong oxidant, the nano-CMD crystallizes in primarily a γ-$MnO_2$ phase (with small portions at less than 50% α-$MnO_2$ and β-$MnO_2$), as described in L. Hill et al., Electrochemical and Solid State Letters, vol. 4, no. 6, 2001, pp. D1-3; X. Wang et al., Journal of the American Chemical Society, vol. 124, no. 12, 2002, pp. 2880-1; H. Fang et al., Journal of Power Sources, 2008, doi: 10.10.1016/.powsour. 2008.04.011).

Specifically, an equimolar amount of solid $(NH_4)_2S_2O_8$ or an aqueous solution of $(NH_4)_2S_2O_8$ powder is added to a 0.4 M $MnSO_4$ aqueous solution with stirring at 80-95° C. during a 8 hour period (~2° C./hr). The solution was then cooled to room temperature in about an hour with continuous stirring. The solid product is separated from the supernatant liquid by decantation, followed by pressure filtration. The solid was washed with aliquots of distilled/de-ionized water until the

TABLE 1B

Electrochemical properties of acid-treated commercial EMD sample

| | Commercial EMD & Treated EMD | | | |
| --- | --- | --- | --- | --- |
| Properties | Control: Commercial Sample (a) | Sulfuric acid treated (2° C.) Sample (c) | Nitric acid treated (85° C.) Sample (d) | Performance improvement over the control |
| OCV (fresh cell) | 1.62 V | 1.74 V | ~1.73 V | +0.10 V |
| OCV (after 30 days storage) | 1.61 V | 1.65 V | ~1.65 V | +0.03 V |
| Average Running V | 1.248 V | 1.272 V | 1.267 V | +0.02 V |
| Specific capacity to 1.0 V cut-off (mAh/g) | 247 | 268 | 274 | +8 to 10% range |
| Specific capacity to 0.9 V cut-off (mAh/g) | 266 | 282 | 292 | +6 to 10% range |
| Specific capacity to 0.8 V cut-off (mAh/g) | 280 | 291 | 303 | +4 to 8% range |
| Specific capacity to 0.6 V cut-off (mAh/g) | 306.78 | 316.92 | 322.64 | +3 to +5% increase |

Example 5

Acid Treatment of Milled Manganese Dioxide

Acid treatment could be used to increase the electrochemical capacity of a manganese dioxide that has a decreased electrochemical capacity due to high energy milling, or due to partial chemical reduction of Mn(IV) during lithiation or other chemical processes.

Commercial EMD sample (a) was milled in a SPEX Model 8000D mixer mill to achieve particle sizes <5 microns (D50). 10 g of commercial EMD sample (a) was milled for 20 minutes. A portion of a milled sample was acid treated in a procedure similar to Example 2, with aqueous sulfuric acid at about 2° C. to afford sample (e).

Example 6

Preparation of Nano-CMD

Nano CMD was prepared by dissolving $MnSO_4 \cdot H_2O$ in distilled water along with ammonium peroxydisulfate, at washings have a pH value ~6-7. The washed solid was then dried in air for 24 hours at 100° C. to provide sample (f).

Figure 5:
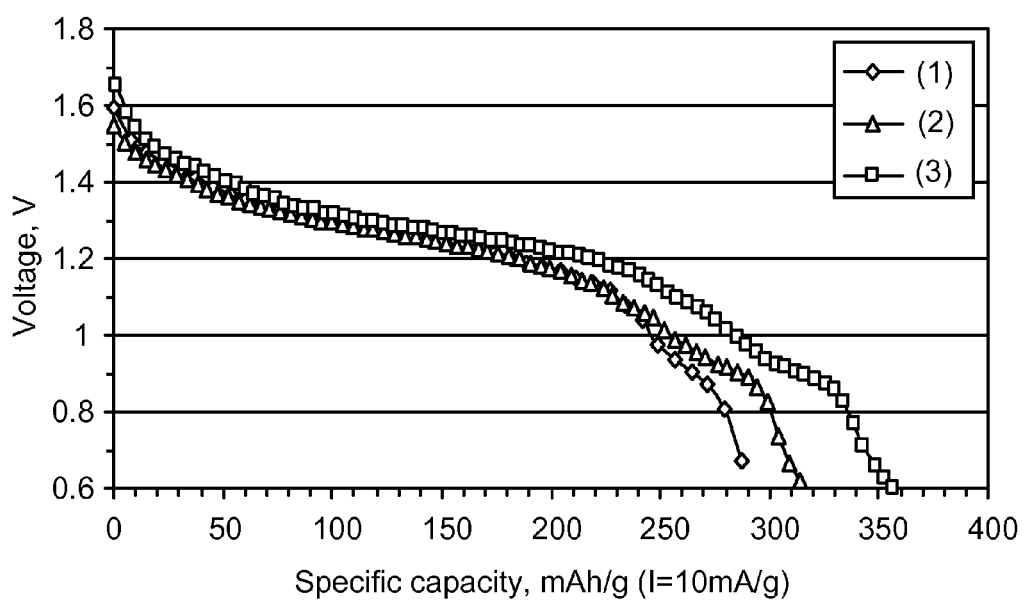
FIG. 5 is a plot of voltage vs. specific capacity in button cells against a Zn anode for performances of commercial EMD, milled commercial EMD, and a milled and acid-treated commercial EMD.
Figure 6:
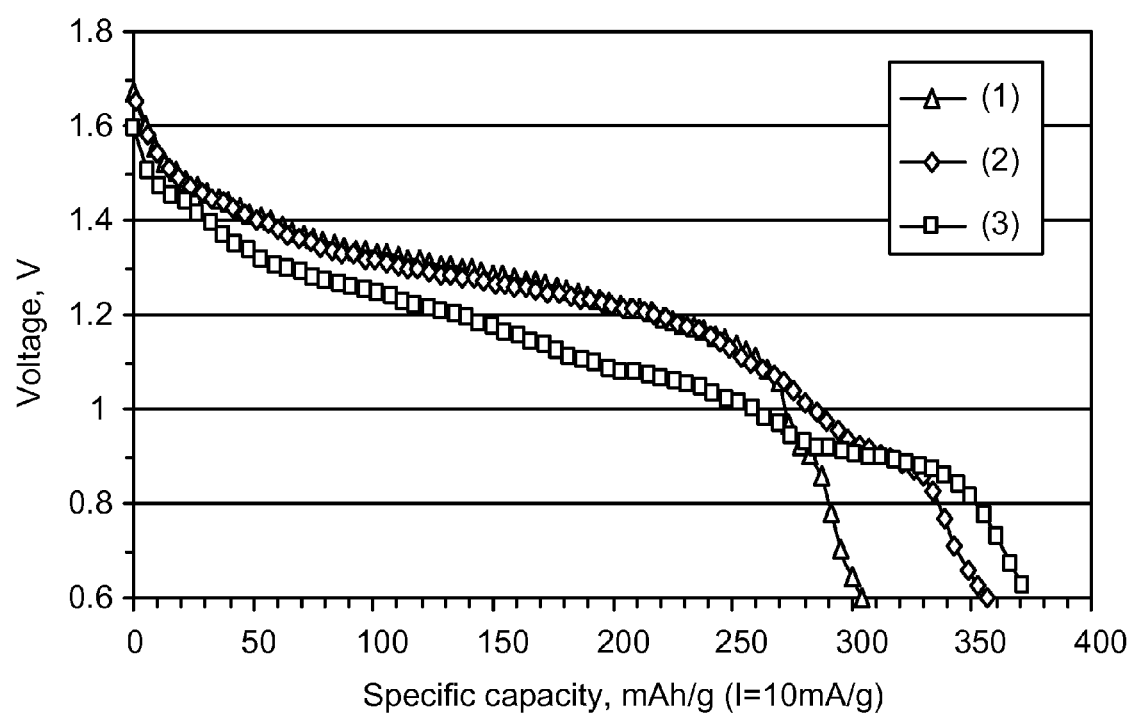
FIG. 6 is a plot of voltage vs. specific capacity in button cells against a Zn anode for performances of (1) acid-treated EMD, (2) milled and acid-treated EMD, and (3) nano-CMD.

The particles sizes of the nano-CMD were in the submicron range. The voltage profile and specific capacity of this sample were compared in a button cell to samples (c), (d), and starting EMD and CMD materials. The electrochemical results from button cells showed that the milling of commercial EMD degraded the voltage to a small extent but did not increase capacity or voltage due to enhanced kinetics. On acid treatment of the milled untreated EMD, the voltage and capacity increases as shown in FIGS. 5 and 6. Referring to FIG. 5, (1) corresponds to sample (a), (2) corresponds to the milled commercial EMD sample, and (3) corresponds to sample (e). Referring to FIG. 6, (1) corresponds to sample (c), (2) corresponds to sample (e), and (3) corresponds to sample (f). In addition, as shown in Table 2, the acid-treated EMD showed a performance advantage over nano-CMD (both voltage and capacity). These results suggest that one could generate a wide range of particle sizes for EMD and hence could tune the packing density to a maximum value in a practical cell to achieve maximum capacity.

TABLE 2

Electrochemical property comparison of acid treated commercial
EMD/milled commercial EMD samples with nano-CMD

| Electrochemical Properties | Commercial EMD Sample (a) | Nano-CMD Sample (f) | Milled Commercial EMD | Sulfuric acid treated commercial Sample (c) | Sulfuric acid treated Milled commercial Sample (e) |
|---|---|---|---|---|---|
| OCV (fresh) | 1.65 V | 1.61 V | 1.61 V | 1.74 V | 1.71 V |
| Sp. capacity to 1.0 V cut-off (mAh/g) | 247 | 258 | 254 | 268 | 283 |
| Sp. capacity to 0.9 V cut-off (mAh/g) | 266 | 288 | 287 | 282 | 314 |
| Sp. capacity to 0.8 V cut-off (mAh/g) | 280 | 357 | 301 | 291 | 336 |

Example 7

Process Variations

Process variations were carried out for acid treatment of EMD samples at 0-2° C. For example, the acid concentration was varied from 1 to 12M. The 6M sulfuric acid was reused up to 6 times. The capacities of the acid treated samples were evaluated in button cells at low rate to assess the effect of process variables. The results are tabulated in Table 3, where the capacity and voltage benefit were shown to increase on increasing acid concentration (up to 6M), holding nearly constant at acid concentrations higher than 6M.

TABLE 3

Electrochemical properties of acid treated commercial EMD sample

| Concentration of the sulfuric acid used for acid-treating commercial EMD at 0 to 2° C. | Electrochemical Properties | | |
|---|---|---|---|
| | Sp. Capacity observed to 0.8 V cut-off (mAh/g) | Discharge running voltage at 250 mAh/g capacity | Discharge running voltage at 280 mAh/g capacity |
| Control EMD (No acid-treatment) | ~280 | ~1.00 V | ~0.80 V |
| 1M | ~280 | ~1.10 V | ~0.80 V |
| 3M | ~280 | ~1.10 V | ~0.82 V |
| 4M | ~280 | ~1.10 V | ~0.85 V |
| 6M | ~291 | ~1.12 V | ~0.92 V |
| 8M | ~302 | ~1.14 V | ~0.96 V |
| 10M | ~303 | ~1.15 V | ~0.97 V |
| 12M | ~304 | ~1.15 V | ~0.96 V |

Button cells including samples that were treated with 6M or higher acid concentration of sulfuric acid had larger capacities. Further, 6 M sulfuric acid could be re-used multiple times (e.g., up to 5 times) with little or no negative impact on the capacity of the acid-treated EMD.

Acid-treatment durations of between 4-12 h for 6M sulfuric acid showed little difference in the resulting button cells capacities. The ratio of acid to EMD varied between experimental setups, but overall a volume ratio of EMD:$H_2SO_4$ (6M) between 1:5 and 1:40 showed similar results.

Example 8

Characterization of Acid-Treated EMD

Table 4 provides a summary of the characteristics of acid-treated EMD for samples (a), (c), and (d).

TABLE 4

Physical and chemical properties of
acid-treated commercial EMD sample

| | EMD | | |
|---|---|---|---|
| Properties | Commercial Sample (a) | Sulfuric acid treated sample Sample (c) | Nitric acid treated sample Sample (d) |
| BET SSA, (m$^2$/g) | 33 | 37 | 38 |
| D$_{50}$ particle size (µm) | 40 | 40 | 41 |
| Tap density (g/cm$^3$) | 2.10 | 2.08 | 2.10 |

TABLE 4-continued

Physical and chemical properties of
acid-treated commercial EMD sample

| | EMD | | |
|---|---|---|---|
| Properties | Commercial Sample (a) | Sulfuric acid treated sample Sample (c) | Nitric acid treated sample Sample (d) |
| True density, spinel (g/cm$^3$) | 4.223 | 4.196 | 4.219 |
| OCV | 1.65 | 1.74 | 1.73 |
| Specific capacity, mAh/g | 293 | 303 | 320 |
| Average Discharge voltage | 1.248 V | 1.272 V | 1.267 V |

TABLE 4-continued

Physical and chemical properties of
acid-treated commercial EMD sample

| | EMD | | |
|---|---|---|---|
| Properties | Commercial Sample (a) | Sulfuric acid treated sample Sample (c) | Nitric acid treated sample Sample (d) |
| Na, ppm | 2200 | 423 | 163 |
| K, ppm | 300 (500) | 210 | 110 |
| SO$_4$, ppm (%) | 377 (1.25%) | (1.35%) | (1.19%) |
| Fe, (ppm) | 30 | 7.8 | 6.3 |

It is believed that the acid treatment converted an amount of (<5%) EMD to CMD, resulting in a net increase in surface area and decrease in particle size, tap density and true density as measured. Table 5 shows the performance improvement in AA batteries including an acid treated EMD.

TABLE 5

Performance improvement in AA batteries including an acid-treated EMD versus AA batteries including non-acid treated commercial EMD. Typical percent improvement in performance

| AA, Performance Test | Acid-treated EMD (H$_2$SO$_4$) | Acid-treated EMD (HNO$_3$) |
|---|---|---|
| Remote Control 24 Ohm at 15 sec/min, run for duration of 8 h/d, until 1.0 V cathode voltage (service hours) | +0.6% | +1.6% |
| CD 0.25 A at 1 h/day, until 0.9 V cathode voltage, (service hours) | +2.3% | +4.7% |
| Toy cell run at 3.9 ohm for 1 h/day, rest for 23 h/day, continued until cell reached 0.8 V cathode voltage (service hours) | +1.2% | +1.0% |
| Digital camera test 1500 mW for 2 s, followed by 650 mW for 28 s, repeated for 5 min/hour, until cell reaches 1.05 V cathode voltage (pulses) | +25.0% | +26.0% |
| Toothbrush | +4.2% | +4.5% |
| Photo | +7.4% | +6.1% |

Chemical Analysis of Commercial and Acid Treated EMD Samples

Figure 7:
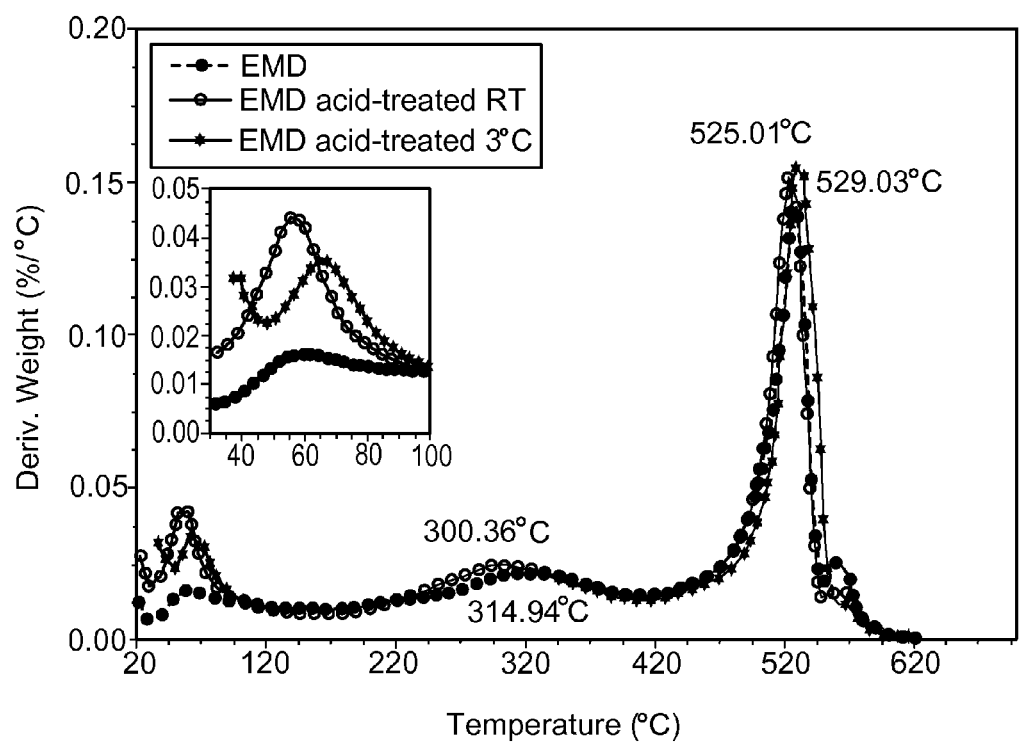
FIG. 7 shows mathematical derivative values of percent weight loss (measured by thermogravimetric analysis) for commercial EMD and acid-treated manganese dioxide samples.

The content of the alkali metals/transition metals in the EMD/CMD was determined by inductively coupled plasma atomic emission spectroscopy. The content of total hydrogen was determined by prompt gamma-ray activation analysis (University of Texas, Austin). In some embodiments, chemical analyses of metals/metal dioxide were performed by a commercial analytical laboratory (Galbraith Laboratories, Inc.). The total water content was determined by thermogravimetric analysis ("TGA") and the derivative of the percent weight loss was plotted as shown in the FIG. 6. Derivatives of percent weight loss showed that the acid-treated samples have a higher weight loss at around 100° C. when compared to commercial EMD, implying a relatively higher water content in the acid treated samples. Referring to FIG. 7, a higher water content (e.g., an increase in total hydrogen content) was shown in the acid-treated manganese dioxide samples at ambient temperature. An increase in total hydrogen content of acid-treated manganese dioxide was also measured in neutron activation analyses.

In addition, cell discharge performance data showed that the acid-treated samples of EMD that had lower amounts of Na, K, Cr, and also had higher amounts of total hydrogen (or water) content provided enhanced electrochemical performance, when compared to samples of untreated manganese dioxide.

Example 9

Acid Treatment of a Partially Reduced Chemically-Derived Manganese Dioxide

A chemical reducing reagent, such as hydrazine hydrate was used to reduce quantitatively (<25% of Mn(IV)) the Mn(IV) followed by subsequent acid digestion in either nitric acid at 85° C. or sulfuric acid at 2° C. regeneration Mn(III) back to Mn(IV) was shown from electrochemical data. This particular example is further explained at length for the case of a CMD sample.

9(a) Preparation of p-CMD

A p-CMD manganese dioxide sample was prepared by dissolving one mole (169 grams) MnSO$_4$.H$_2$O in one liter of distilled water along with 238 grams Na$_2$S$_2$O$_8$ p-CMD has been disclosed, for example, in U.S. Pat. No. 5,277,890.

A small amount of 1M H$_2$SO$_4$ was added to give a pH of 2.0. The solution was stirred and heated to a temperature of 68° C. for six hours, then allowed to cool overnight. Li$_2$CO$_3$ was added to adjust solution pH to 1.8 and then heated at 68° C. for eight more hours. The produced MnO$_2$ was collected on a Millipore filter, dried overnight at 60° C. and found to weight 64 grams, indicating an overall yield of about 74%. This material is identified as sample (g).

9(b) Preparation of Partially Reduced p-CMD 60 grams of sample (g) were dispersed in about 1 liter of water with vigorous stirring. 2.5 grams hydrazine hydrate dissolved in 20 cc water were added drop-wise. The hydrazine hydrate N$_2$H$_4$.H$_2$O reduced the MnO$_2$ according to the equation:

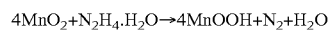

$$4MnO_2+N_2H_4.H_2O \rightarrow 4MnOOH+N_2+H_2O$$

The amount of hydrazine was selected to reduce the MnO$_2$ by about 25%. About 20 minutes after visible gas evolution has ceased, the reduced MnO$_2$ was collected on a Millipore filter, dried overnight at 60 C and labeled as sample (h). Four grams of sample (h) were retained for characterization and the remainder used in example 10(c)-10(e) below.

9(c) Acid Treating the Reduced/Parent p-CMD 56 grams of MnO$_2$ from sample (h) were placed in about 1 L chilled 6M H$_2$SO$_4$ and allowed to stand overnight with stirring. The resulting very dark suspension was again filtered on a Millipore filter and produced a dark color precipitate and deep red solution. The red solution was reserved while the solid powder was washed several times with water to removed residual acid and then dried at 60 C as sample (i).

9(d) XRD Characterization of the p-CMD Samples

Figure 8:
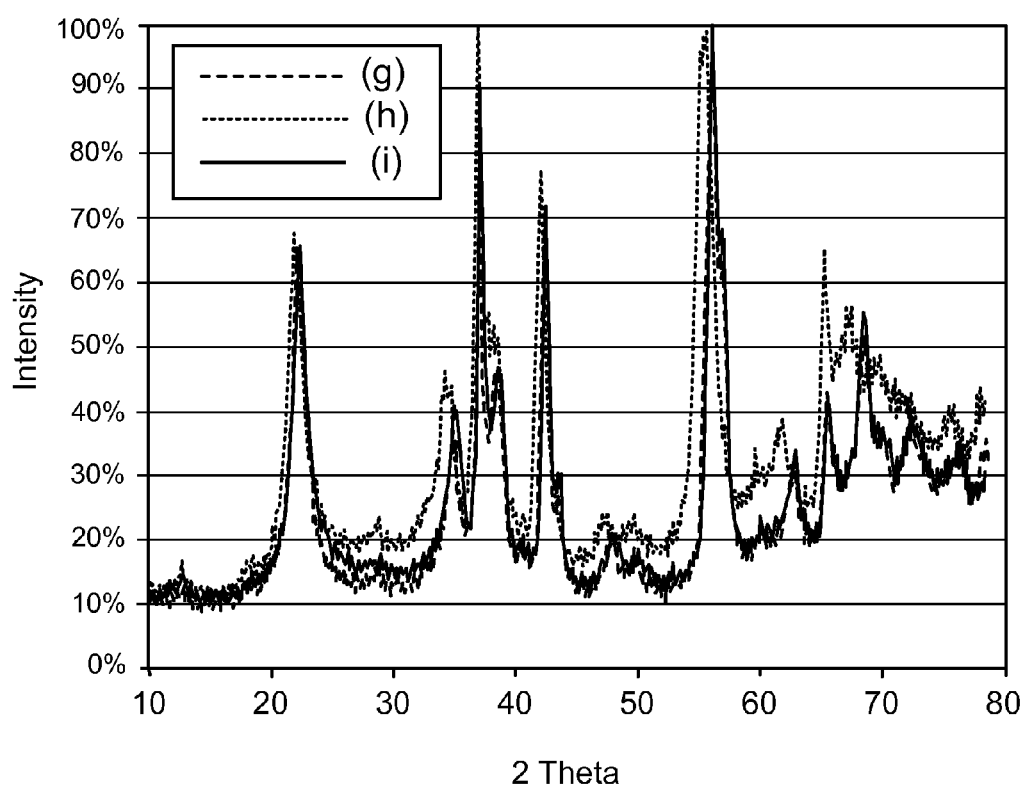
FIG. 8 is an X-ray diffraction pattern of a chemically reduced and acid-treated manganese dioxide.

Referring to FIG. 8, the XRD powder patterns of the samples (g), (h), and (i) were determined on a Miniflex XRD unit using Cr k(alpha) radiation and plotted with angles corrected to copper k(alpha) radiation. As shown in the FIG. 8, samples (g) and (i) had essentially identical XRD patterns while the sample (h) showed obvious shifts in many lines to lower angle indicative of reduction of some of the ramsdellite to groutite. This indicated the acid treatment process has re-oxidized some or nearly all of the Mn (III) in sample (i) back to Mn(IV) as in sample (g).

9(e) Electrochemical Discharge Studies

Figure 9:
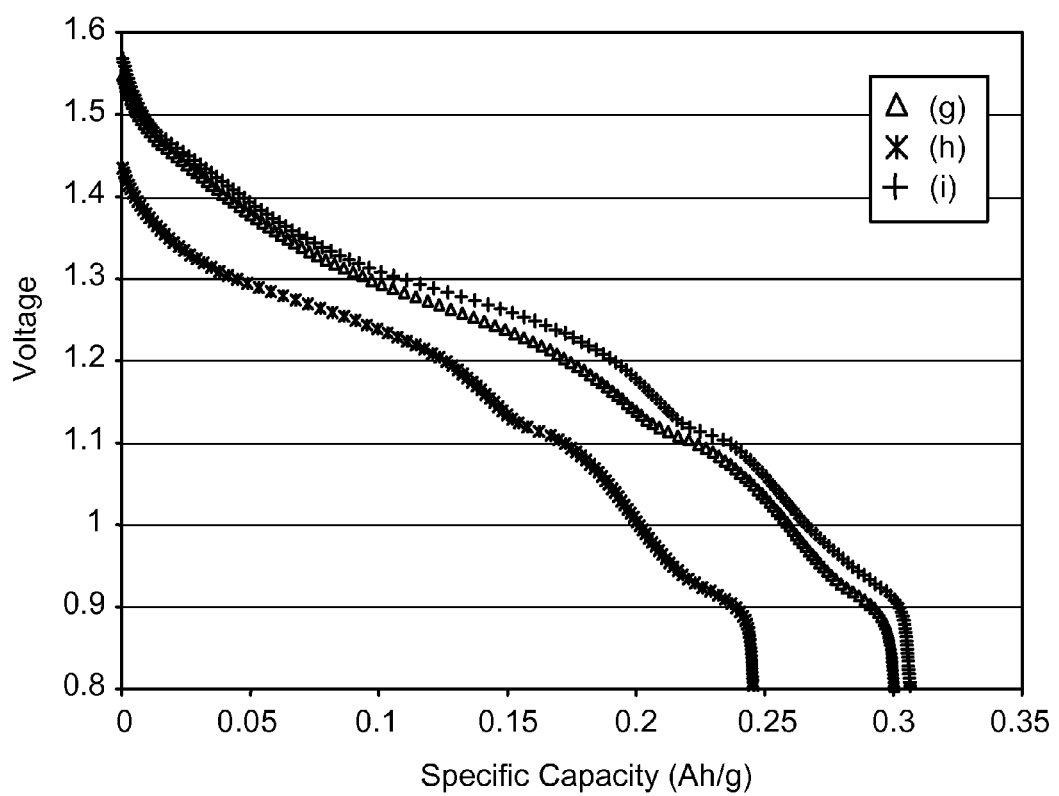
FIG. 9 is a plot of voltage vs. capacity for three chemically synthesized manganese dioxide samples.

The overall capacity from the button cell test was closely related to the total amount of Mn(IV) present in the $MnO_2$. The voltage as a function of capacity was shown in FIG. 9 and indicated that the p-CMD (sample (g)) and acid-treated p-CMD (sample (i)) had higher capacity, and the data demonstrates the regeneration of Mn(IV) that was reduced during the chemical reduction from hydrazine.

All references, such as patent applications, publications, and patents, referred to herein are incorporated by reference in their entirety.

Other embodiments are in the claims.

What is claimed is:

1. A method of making a cathode comprising:
   treating an untreated manganese dioxide with an aqueous acid at a temperature of fifteen degrees Celsius or less to afford an acid-treated manganese dioxide; and
   incorporating the acid-treated manganese dioxide into a cathode.

2. The method of claim 1, wherein the untreated manganese dioxide is selected from the group consisting of an electrolytic manganese dioxide, a chemically synthesized manganese dioxide, and combinations thereof.

3. The method of claim 1, wherein the untreated manganese dioxide is treated with an aqueous acid at a temperature of zero degrees Celsius or more to five degrees Celsius or less to afford the acid-treated manganese dioxide.

4. The method of claim 1, wherein the untreated manganese dioxide has a formula of Month axel, wherein x is 1.90 or more.

5. The method of claim 1, wherein the acid-treated manganese dioxide comprises a decreased amount of Man(III) and an increased amount of Man(IV) compared to the untreated manganese dioxide.

6. The method of claim 1, wherein the acid-treated manganese dioxide comprises a Man(III) content of three percent by weight or lower.

7. The method of claim 1, wherein the acid-treated manganese dioxide has a lower impurity content than the untreated manganese dioxide.

8. The method of claim 7, wherein the impurity is selected from the group consisting of Fe, Na, Ca, Al, Co, Mo, Cr, Cu, BP, V, Ni, Sb, As, Ge, and combinations thereof.

9. The method of claim 1, further comprising milling the untreated manganese dioxide prior to treating with an aqueous acid.

10. The method of claim 9, wherein after milling, the untreated manganese dioxide has an average particle diameter that is smaller than an average particle diameter of the untreated manganese dioxide prior to milling.

11. The method of claim 9, wherein after milling, the untreated manganese dioxide has an average particle diameter of about five micrometers or less.

12. The method of claim 1, wherein the acid-treated manganese dioxide has an increased specific capacity of 3% or more relative to the untreated manganese dioxide.

13. The method of claim 1, wherein the acid-treated manganese dioxide has a specific capacity increase of between 3% and 20% relative to the untreated the manganese dioxide.

14. The method of claim 1, wherein the acid-treated manganese dioxide has a BET surface area increase of between 0% and 20% relative to the untreated manganese dioxide.

15. The method of claim 1, wherein untreated manganese dioxide is treated with the aqueous acid for 12 to 24 hours.

16. The method of claim 1, wherein the aqueous acid is aqueous sulfuric acid.

17. The method of claim 16, further comprising reusing the aqueous sulfuric acid for treating the untreated manganese dioxide.

18. The method of claim 1, wherein the aqueous acid has a concentration of between 2 M and 12 M.

19. A method of making a battery, comprising:
    incorporating a cathode including an acid-treated manganese dioxide that has been prepared by treating an untreated manganese dioxide with an aqueous acid at a temperature of 15 degrees Celsius or less, into a battery.

20. The method of claim 19, wherein the untreated manganese dioxide is selected from the group consisting of an electrolytic manganese dioxide, a chemically synthesized manganese dioxide, and combinations thereof.

21. The method of claim 19, wherein the untreated manganese dioxide has a formula of $MnO_x$, wherein x is 1.90 or more.

22. The method of claim 19, wherein the acid-treated manganese dioxide comprises a decreased amount of Mn(III) and an increased amount of Mn(IV) compared to the untreated manganese dioxide.

23. The method of claim 19, wherein the acid-treated manganese dioxide comprises a Mn(III) content of three percent or lower, by weight of total manganese dioxide.

* * * * *

UNITED STATES PATENT AND TRADEMARK OFFICE
CERTIFICATE OF CORRECTION

PATENT NO.         : 8,303,840 B2                                Page 1 of 1
APPLICATION NO.    : 12/722751
DATED              : November 6, 2012
INVENTOR(S)        : Kirakodu S. Nanjundaswamy et al.

It is certified that error appears in the above-identified patent and that said Letters Patent is hereby corrected as shown below:

Col. 25, Line 29, In Claim 4, delete "Month axel ," and insert --MnOx,--, therefor.

Col. 25, Line 32, In Claim 5, delete "Man(III)" and insert --Mn(III)--, therefor.

Col. 25, Line 33, In Claim 5, delete "Man(IV)" and insert --Mn(IV)--, therefor.

Col. 25, Line 36, In Claim 6, delete "Man(III)" and insert --Mn(III)--, therefor.

Col. 25, Line 43, In Claim 8, delete "BP," and insert --Pb,--, therefor.

Signed and Sealed this
Fifth Day of February, 2013

Teresa Stanek Rea
*Acting Director of the United States Patent and Trademark Office*